(12) United States Patent
Barber et al.

(10) Patent No.: US 11,933,901 B1
(45) Date of Patent: Mar. 19, 2024

(54) LIGHT DETECTION AND RANGING (LIDAR) SENSOR SYSTEM INCLUDING BISTATIC TRANSCEIVER

(71) Applicant: Aurora Operations, Inc., Mountain View, CA (US)

(72) Inventors: Zeb Barber, Bozeman, MT (US); Stefan Heinemann, Bozeman, MT (US); Randy Reibel, Bozeman, MT (US)

(73) Assignee: AURORA OPERATIONS, INC., Mountain View, CA (US)

( * ) Notice: Subject to any disclaimer, the term of this patent is extended or adjusted under 35 U.S.C. 154(b) by 0 days.

(21) Appl. No.: 17/944,849

(22) Filed: Sep. 14, 2022

(51) Int. Cl.
| | |
|---|---|
| *G01C 3/08* | (2006.01) |
| *G01S 7/481* | (2006.01) |
| *G01S 7/499* | (2006.01) |
| *G01S 17/931* | (2020.01) |
| *G02B 6/12* | (2006.01) |

(52) U.S. Cl.
CPC .......... *G01S 17/931* (2020.01); *G01S 7/4812* (2013.01); *G01S 7/4817* (2013.01); *G01S 7/499* (2013.01); *G02B 6/12004* (2013.01)

(58) Field of Classification Search
CPC .... G01S 17/931; G01S 7/4812; G01S 7/4817; G01S 7/499; G02B 6/12004
See application file for complete search history.

(56) References Cited

U.S. PATENT DOCUMENTS

| | | | |
|---|---|---|---|
| 2015/0260843 A1* | 9/2015 | Lewis | G02B 26/106 356/5.01 |
| 2017/0363808 A1 | 12/2017 | Mahgerefteh et al. | |
| 2021/0055390 A1 | 2/2021 | Lachapelle et al. | |
| 2021/0231866 A1 | 7/2021 | Tu et al. | |
| 2021/0405202 A1 | 12/2021 | Barber et al. | |
| 2022/0043115 A1 | 2/2022 | Lachapelle et al. | |
| 2022/0397678 A1* | 12/2022 | Li | G01S 13/865 |
| 2023/0059270 A1* | 2/2023 | Suga | G01S 7/4814 |

OTHER PUBLICATIONS

Story of Mathematics, "Parallel Lines: Definition, Properties, & Examples". Page copyright 2020, Luke Mastin. https://www.storyofmathematics.com/parallel-lines/ (Year: 2020).*

(Continued)

*Primary Examiner* — Samantha K Nickerson
(74) *Attorney, Agent, or Firm* — FOLEY & LARDNER LLP

(57) ABSTRACT

A light detection and ranging (lidar) system for a vehicle may include a receiver layer, a transmitter layer coupled to the receiver layer through an adhesive layer in a first direction, and one or more optics. The transmitter layer may receive, at a first side of the transmitter layer, a transmit signal from a laser source, and transmit the transmit signal through the one or more optics. The receiver layer may receive, through the one or more optics, a return signal reflected by an object in an environment of the vehicle, and output the return signal at a first side of the receiver layer. The first side of the transmitter layer and the first side of the receiver layer may be apart from and parallel to each other in a second direction crossing the first direction.

20 Claims, 15 Drawing Sheets

(56) References Cited

OTHER PUBLICATIONS

SplashLearn, "Horizontal—Definition with Examples". Page accessible from Aug. 9, 2020 to Apr. 2, 2023, according to WayBackMachine. https://web.archive.org/web/20200801000000*/https://www.splashlearn.com/math-vocabulary/geometry/horizontal (Year: 2020).*
International Search Report and Written Opinion issued in connection with PCT Appl. No. PCT/US2023/029544 dated Nov. 22, 2023.

* cited by examiner

LIGHT DETECTION AND RANGING (LIDAR) SENSOR SYSTEM INCLUDING BISTATIC TRANSCEIVER

BACKGROUND

Light detection and ranging (lidar) sensor systems are used for a variety of applications, from altimetry, to imaging, to collision avoidance. Lidar provides finer scale range resolution with smaller beam sizes than conventional microwave ranging systems, such as radio-wave detection and ranging (radar). Optical detection of range can be accomplished with several different techniques, including direct ranging based on round trip travel time of an optical pulse to an object, and chirped detection based on a frequency difference between a transmitted chirped optical signal and a returned signal scattered from an object, and phase-encoded detection based on a sequence of single frequency phase changes that are distinguishable from natural signals.

In applying these techniques, a lidar sensor system may include a monostatic transceiver or a bistatic transceiver. In a bistatic transceiver, a transmitter and a receiver are separated by a distance. In designing and implement a photonic integrated circuit (PIC) or integrated optical circuit which is a chip that contains photonic components, there is a need for designing and implementing a bistatic transceiver that can be integrated with other optical components in a chip (e.g., integrated circuit) level.

SUMMARY

Implementations of the present disclosure relate to a system and a method for a light detection and ranging (lidar) sensor system, and more particularly to a system and a method for a lidar sensor system including a bistatic transceiver.

In some implementations of the present disclosure, a light detection and ranging (lidar) system for a vehicle may include a receiver layer, a transmitter layer coupled to the receiver layer through an adhesive layer in a first direction, and one or more optics. The transmitter layer may be configured to receive, at a first side of the transmitter layer, a transmit signal from a laser source, and transmit the transmit signal through the one or more optics. The receiver layer may be configured to receive, through the one or more optics, a return signal reflected by an object in an environment of the vehicle, and output the return signal at a first side of the receiver layer. The first side of the transmitter layer and the first side of the receiver layer may be apart from and parallel to each other in a second direction crossing the first direction.

In some implementations of the present disclosure, a method of manufacturing a light detection and ranging (lidar) system, may include forming a receive (Rx) waveguide layer on a substrate. The method may include forming an adhesive layer on the Rx waveguide layer. The method may include forming a transmit (Tx) waveguide layer to be stacked on the Rx waveguide layer in a first direction so as to interpose the adhesive layer between the Tx waveguide layer and the Rx waveguide layer. The method may include coupling one or more receive (Rx) fiber cables of the one or more fiber arrays to a first side of the Rx waveguide layer. The method may include coupling one or more transmit (Tx) fiber cables of one or more fiber arrays to a first side of the Tx waveguide layer. The first side of the Tx waveguide layer and the first side of the Rx waveguide layer may be parallel to each other in a second direction crossing the first direction. The one or more Tx fiber cables and the one or more Rx fiber cables do not overlap in the first direction.

In some implementations of the present disclosure, an autonomous vehicle control system may include one or more processors. The one or more processors may be configured to cause a transmitter layer to receive, at a first side of the transmitter layer, a transmit signal from a laser source, and transmit the transmit signal through one or more optics. The transmitter layer may be coupled to on a receiver layer through an adhesive layer in a first direction. The one or more processors may be configured to cause the receiver layer to receive, through the one or more optics, a return signal reflected by an object in an environment of the vehicle, and output the return signal at a first side of the receiver layer. The first side of the transmitter layer and the first side of the receiver layer may be apart from and parallel to each other in a second direction crossing the first direction.

In some implementations of the present disclosure, an autonomous vehicle may include a light detection and ranging (lidar) system. The lidar system may include a receiver layer, a transmitter layer coupled to the receiver layer through an adhesive layer in a first direction, and one or more optics. The transmitter layer may be configured to receive, at a first side of the transmitter layer, a transmit signal from a laser source, and transmit the transmit signal through the one or more optics. The receiver layer may be configured to receive, through the one or more optics, a return signal reflected by an object in an environment of the vehicle, and output the return signal at a first side of the receiver layer. The first side of the transmitter layer and the first side of the receiver layer may be apart from and parallel to each other in a second direction crossing the first direction.

BRIEF DESCRIPTION OF THE DRAWINGS

The patent or application file contains at least one drawing executed in color. Copies of this patent application publication with color drawing(s) will be provided by the Office upon request and payment of the necessary fee.

These and other aspects and features of the present implementations will become apparent to those ordinarily skilled in the art upon review of the following description of specific implementations in conjunction with the accompanying figures, wherein.

DETAILED DESCRIPTION

According to certain aspects, implementations in the present disclosure relate to a system and a method for controlling a vehicle using light detection and ranging (lidar), and more particularly to a system and a method for a lidar sensor system including a bistatic transceiver. According to certain aspects, a lidar system for a vehicle may include a receiver layer, a transmitter layer stacked on or coupled to the receiver layer in a first direction through an adhesive layer which is interposed between the transmitter layer and the receiver layer, and one or more optics. The transmitter layer may be configured to receive, at a first side of the transmitter layer, a transmit signal from a laser source, and transmit the transmit signal through the one or more optics. The receiver layer may be configured to receive, through the one or more optics, a return signal reflected by an object in an environment of the vehicle, and output the return signal at a first side of the receiver layer. The first side of the transmitter layer and the first side of the receiver layer may be apart from and parallel to each other in a second direction crossing the first direction.

1. System Environment for Autonomous Vehicles

Figure 1A:
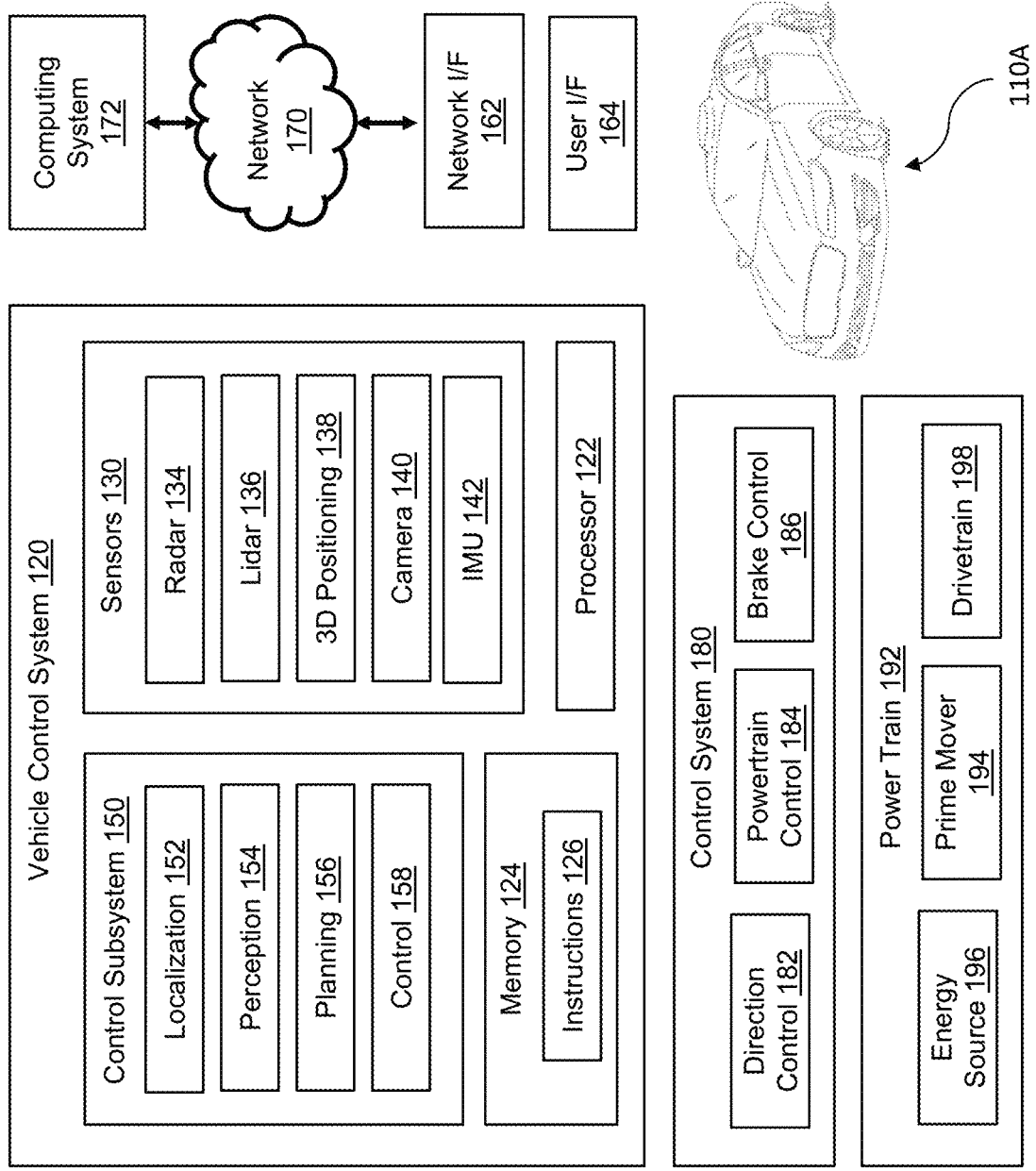
FIG. 1A is a block diagram illustrating an example of a system environment for autonomous vehicles according to some implementations.

FIG. 1A is a block diagram illustrating an example of a system environment for autonomous vehicles according to some implementations.

Referring to FIG. 1A, an example autonomous vehicle 110A within which the various techniques disclosed herein may be implemented. The vehicle 110A, for example, may include a powertrain 192 including a prime mover 194 powered by an energy source 196 and capable of providing power to a drivetrain 198, as well as a control system 180 including a direction control 182, a powertrain control 184, and a brake control 186. The vehicle 110A may be implemented as any number of different types of vehicles, including vehicles capable of transporting people and/or cargo, and capable of traveling in various environments, and it will be appreciated that the aforementioned components 180-198 can vary widely based upon the type of vehicle within which these components are utilized.

For simplicity, the implementations discussed hereinafter will focus on a wheeled land vehicle such as a car, van, truck, bus, etc. In such implementations, the prime mover 194 may include one or more electric motors and/or an internal combustion engine (among others). The energy source may include, for example, a fuel system (e.g., providing gasoline, diesel, hydrogen, etc.), a battery system, solar panels or other renewable energy source, and/or a fuel cell system. The drivetrain 198 can include wheels and/or tires along with a transmission and/or any other mechanical drive components to convert the output of the prime mover 194 into vehicular motion, as well as one or more brakes configured to controllably stop or slow the vehicle 110A and direction or steering components suitable for controlling the trajectory of the vehicle 110A (e.g., a rack and pinion steering linkage enabling one or more wheels of the vehicle 110A to pivot about a generally vertical axis to vary an angle of the rotational planes of the wheels relative to the longitudinal axis of the vehicle). In some implementations, combinations of powertrains and energy sources may be used (e.g., in the case of electric/gas hybrid vehicles), and in some instances multiple electric motors (e.g., dedicated to individual wheels or axles) may be used as a prime mover.

The direction control 182 may include one or more actuators and/or sensors for controlling and receiving feedback from the direction or steering components to enable the vehicle 110A to follow a desired trajectory. The powertrain control 184 may be configured to control the output of the powertrain 102, e.g., to control the output power of the prime mover 194, to control a gear of a transmission in the drivetrain 198, etc., thereby controlling a speed and/or direction of the vehicle 110A. The brake control 116 may be configured to control one or more brakes that slow or stop vehicle 110A, e.g., disk or drum brakes coupled to the wheels of the vehicle.

Other vehicle types, including but not limited to off-road vehicles, all-terrain or tracked vehicles, construction equipment etc., will necessarily utilize different powertrains, drivetrains, energy sources, direction controls, powertrain controls and brake controls. Moreover, in some implementations, some of the components can be combined, e.g., where directional control of a vehicle is primarily handled by varying an output of one or more prime movers. Therefore, implementations disclosed herein are not limited to the particular application of the herein-described techniques in an autonomous wheeled land vehicle.

Various levels of autonomous control over the vehicle 110A can be implemented in a vehicle control system 120, which may include one or more processors 122 and one or more memories 124, with each processor 122 configured to execute program code instructions 126 stored in a memory 124. The processors(s) can include, for example, graphics processing unit(s) ("GPU(s)") and/or central processing unit(s) ("CPU(s)").

Sensors 130 may include various sensors suitable for collecting information from a vehicle's surrounding environment for use in controlling the operation of the vehicle. For example, sensors 130 can include radar sensor 134, lidar (Light Detection and Ranging) sensor 136, a 3D positioning sensor 138, e.g., any of an accelerometer, a gyroscope, a magnetometer, or a satellite navigation system such as GPS (Global Positioning System), GLONASS (Globalnaya Navigazionnaya Sputnikovaya Sistema, or Global Navigation Satellite System), BeiDou Navigation Satellite System (BDS), Galileo, Compass, etc. The 3D positioning sensor 138 can be used to determine the location of the vehicle on the Earth using satellite signals. The sensors 130 can include a camera 140 and/or an IMU (inertial measurement unit) 142. The camera 140 can be a monographic or stereographic camera and can record still and/or video images. The IMU 142 can include multiple gyroscopes and accelerometers capable of detecting linear and rotational motion of the vehicle in three directions. One or more encoders (not illustrated), such as wheel encoders may be used to monitor the rotation of one or more wheels of vehicle 110A. Each sensor 130 can output sensor data at various data rates, which may be different than the data rates of other sensors 130.

The outputs of sensors 130 may be provided to a set of control subsystems 150, including, a localization subsystem 152, a planning subsystem 156, a perception subsystem 154, and a control subsystem 158. The localization subsystem 152 can perform functions such as precisely determining the location and orientation (also sometimes referred to as "pose") of the vehicle 110A within its surrounding environment, and generally within some frame of reference. The location of an autonomous vehicle can be compared with the location of an additional vehicle in the same environment as part of generating labeled autonomous vehicle data. The perception subsystem 154 can perform functions such as detecting, tracking, determining, and/or identifying objects within the environment surrounding vehicle 110A. A machine learning model can be utilized in tracking objects. The planning subsystem 156 can perform functions such as planning a trajectory for vehicle 110A over some timeframe given a desired destination as well as the static and moving objects within the environment. A machine learning can be utilized in planning a vehicle trajectory. The control subsystem 158 can perform functions such as generating suitable control signals for controlling the various controls in the vehicle control system 120 in order to implement the planned trajectory of the vehicle 110A. A machine learning model can be utilized to generate one or more signals to control an autonomous vehicle to implement the planned trajectory.

It will be appreciated that the collection of components illustrated in FIG. 1A for the vehicle control system 120 is merely exemplary in nature. Individual sensors may be omitted in some implementations. Additionally or alternatively, in some implementations, multiple sensors of types illustrated in FIG. 1A may be used for redundancy and/or to cover different regions around a vehicle, and other types of sensors may be used. Likewise, different types and/or combinations of control subsystems may be used in other implementations. Further, while subsystems 152-158 are illustrated as being separate from processor 122 and memory 124, it will be appreciated that in some implementations, some or all of the functionality of a subsystem 152-158 may be implemented with program code instructions 126 resident in one or more memories 124 and executed by one or more processors 122, and that these subsystems 152-158 may in some instances be implemented using the same processor(s) and/or memory. Subsystems may be implemented at least in part using various dedicated circuit logic, various processors, various field programmable gate arrays ("FPGA"), various application-specific integrated circuits ("ASIC"), various real time controllers, and the like, as noted above, multiple subsystems may utilize circuitry, processors, sensors, and/or other components. Further, the various components in the vehicle control system 120 may be networked in various manners.

In some implementations, the vehicle 110A may also include a secondary vehicle control system (not illustrated), which may be used as a redundant or backup control system for the vehicle 110A. The secondary vehicle control system may be capable of fully operating the autonomous vehicle 110A in the event of an adverse event in the vehicle control system 120, while in other implementations, the secondary vehicle control system may only have limited functionality, e.g., to perform a controlled stop of the vehicle 110A in response to an adverse event detected in the primary vehicle control system 120. In still other implementations, the secondary vehicle control system may be omitted.

In general, an innumerable number of different architectures, including various combinations of software, hardware, circuit logic, sensors, networks, etc. may be used to implement the various components illustrated in FIG. 1A. Each processor may be implemented, for example, as a microprocessor and each memory may represent the random access memory ("RAM") devices comprising a main storage, as well as any supplemental levels of memory, e.g., cache memories, non-volatile or backup memories (e.g., programmable or flash memories), read-only memories, etc. In addition, each memory may be considered to include memory storage physically located elsewhere in the vehicle 110A, e.g., any cache memory in a processor, as well as any storage capacity used as a virtual memory, e.g., as stored on a mass storage device or another computer controller. One or more processors illustrated in FIG. 1A, or entirely separate processors, may be used to implement additional functionality in the vehicle 110A outside of the purposes of autonomous control, e.g., to control entertainment systems, to operate doors, lights, convenience features, etc.

In addition, for additional storage, the vehicle 110A may include one or more mass storage devices, e.g., a removable disk drive, a hard disk drive, a direct access storage device ("DASD"), an optical drive (e.g., a CD drive, a DVD drive, etc.), a solid state storage drive ("SSD"), network attached storage, a storage area network, and/or a tape drive, among others.

Furthermore, the vehicle 110A may include a user interface 164 to enable vehicle 110A to receive a number of inputs from and generate outputs for a user or operator, e.g., one or more displays, touchscreens, voice and/or gesture interfaces, buttons and other tactile controls, etc. Otherwise, user input may be received via another computer or electronic device, e.g., via an app on a mobile device or via a web interface.

Figure 8:
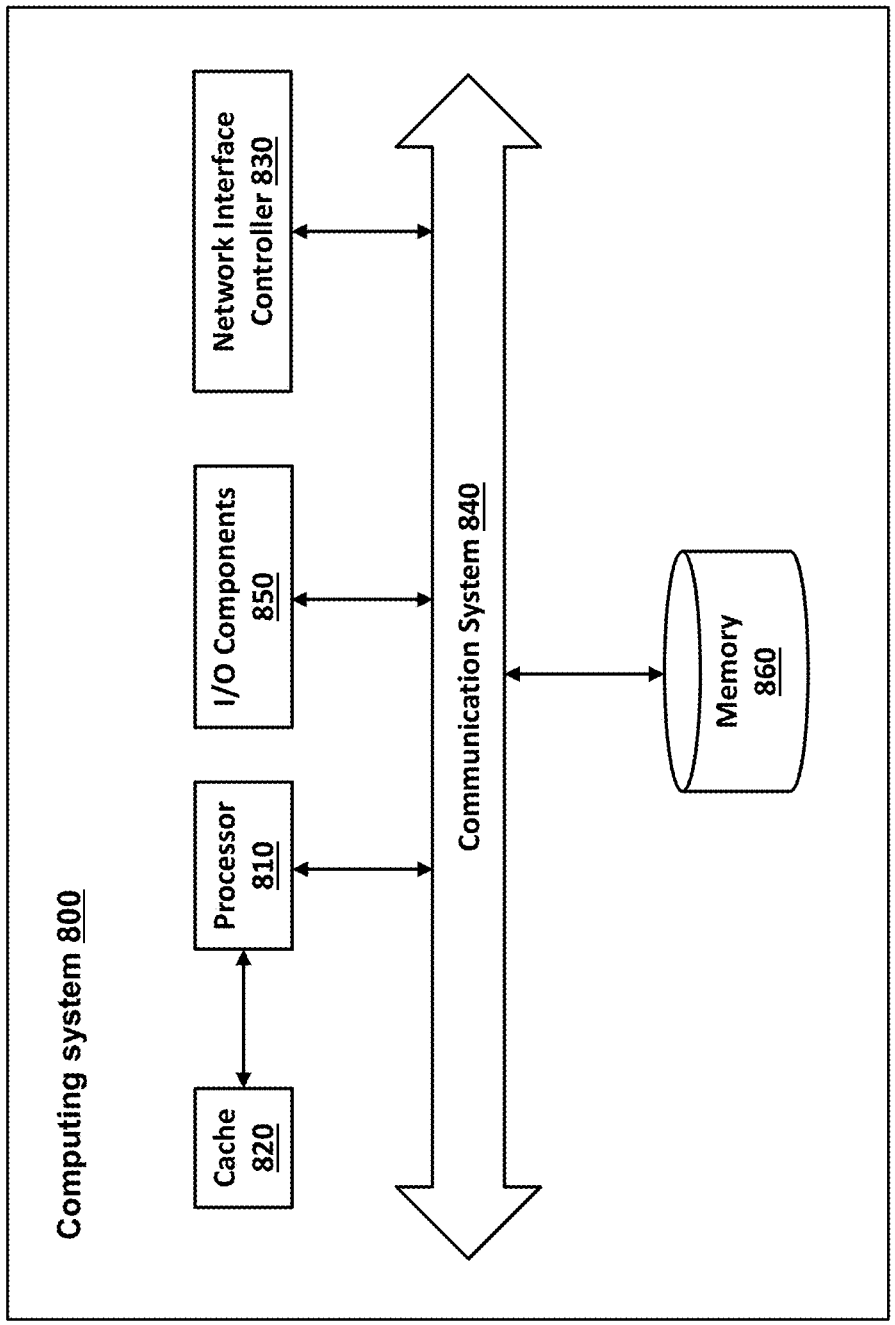
FIG. 8 is a block diagram illustrating an example of a computing system according to some implementations.

Moreover, the vehicle 110A may include one or more network interfaces, e.g., network interface 162, suitable for communicating with one or more networks 170 (e.g., a Local Area Network ("LAN"), a wide area network ("WAN"), a wireless network, and/or the Internet, among others) to permit the communication of information with other computers and electronic device, including, for example, a central service, such as a cloud service, from which the vehicle 110A receives environmental and other data for use in autonomous control thereof. Data collected by the one or more sensors 130 can be uploaded to a computing system 172 via the network 170 for additional processing. A time stamp can be added to each instance of vehicle data prior to uploading. In some implementations, the computing system 172 may have configuration similar to that of a computing system 800 as shown in FIG. 8.

Each processor illustrated in FIG. 1A, as well as various additional controllers and subsystems disclosed herein, generally operates under the control of an operating system and executes or otherwise relies upon various computer software applications, components, programs, objects, modules, data structures, etc., as will be described in greater detail below. Moreover, various applications, components, programs, objects, modules, etc. may also execute on one or more processors in another computer coupled to vehicle 110A via network 170, e.g., in a distributed, cloud-based, or client-server computing environment, whereby the processing required to implement the functions of a computer program may be allocated to multiple computers and/or services over a network.

In general, the routines executed to implement the various implementations described herein, whether implemented as part of an operating system or a specific application, component, program, object, module or sequence of instructions, or even a subset thereof, will be referred to herein as "program code". Program code can include one or more instructions that are resident at various times in various memory and storage devices, and that, when read and executed by one or more processors, perform the steps necessary to execute steps or elements embodying the various aspects of the present disclosure. Moreover, while implementations have and hereinafter will be described in the context of fully functioning computers and systems, it will be appreciated that the various implementations described herein are capable of being distributed as a program product in a variety of forms, and that implementations can be implemented regardless of the particular type of computer readable media used to actually carry out the distribution.

Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.) among others.

In addition, various program code described hereinafter may be identified based upon the application within which it is implemented in a specific implementation. However, it should be appreciated that any particular program nomenclature that follows is used merely for convenience, and thus the present disclosure should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the present disclosure is not limited to the specific organization and allocation of program functionality described herein.

The environment illustrated in FIG. 1A is not intended to limit implementations disclosed herein. Indeed, other alternative hardware and/or software environments may be used without departing from the scope of implementations disclosed herein.

2. FM LIDAR for Automotive Applications

Figure 2:
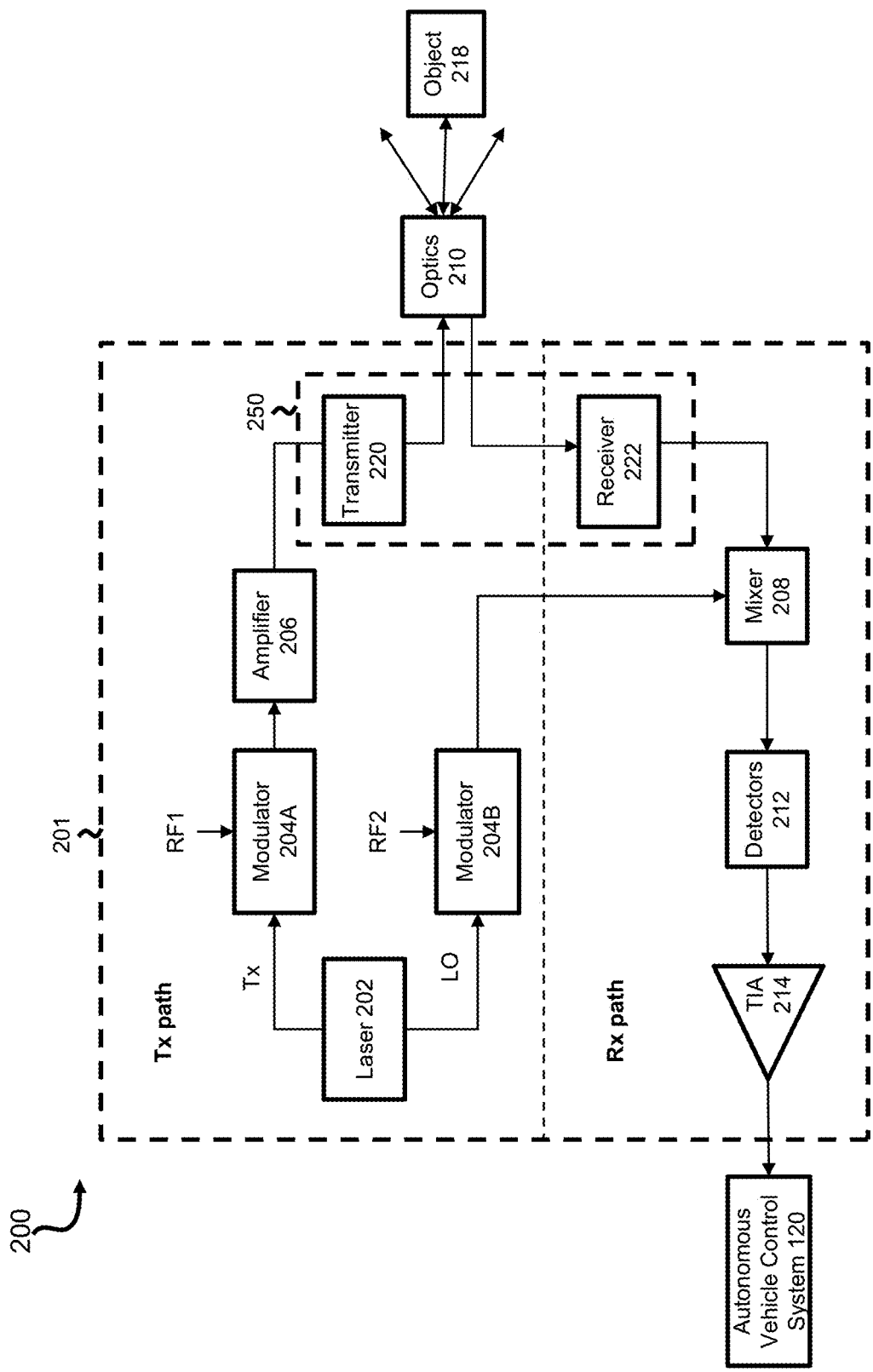
FIG. 2 is a block diagram illustrating an example of a lidar system for autonomous vehicles, according to some implementations.

A truck can include a lidar system (e.g., vehicle control system 120 in FIG. 1A, lidar system 201 in FIG. 2). In some implementations, the lidar system can use frequency modulation to encode an optical signal and scatter the encoded optical signal into free-space using optics. By detecting the frequency differences between the encoded optical signal and a returned signal reflected back from an object, the frequency modulated (FM) lidar system can determine the location of the object and/or precisely measure the velocity of the object using the Doppler effect. An FM lidar system may use a continuous wave (referred to as, "FMCW lidar" or "coherent FMCW lidar") or a quasi-continuous wave (referred to as, "FMQW lidar"). The lidar system can use phase modulation (PM) to encode an optical signal and scatters the encoded optical signal into free-space using optics.

An FM or phase-modulated (PM) lidar system may provide substantial advantages over conventional lidar systems with respect to automotive and/or commercial trucking applications. To begin, in some instances, an object (e.g., a pedestrian wearing dark clothing) may have a low reflectivity, in that it only reflects back to the sensors (e.g., sensors 130 in FIG. 1A) of the FM or PM lidar system a low amount (e.g., 10% or less) of the light that hit the object. In other instances, an object (e.g., a shiny road sign) may have a high reflectivity (e.g., above 10%), in that it reflects back to the sensors of the FM lidar system a high amount of the light that hit the object.

Regardless of the object's reflectivity, an FM lidar system may be able to detect (e.g., classify, recognize, discover, etc.) the object at greater distances (e.g., 2×) than a conventional lidar system. For example, an FM lidar system may detect a low reflectivity object beyond 300 meters, and a high reflectivity object beyond 400 meters.

To achieve such improvements in detection capability, the FM lidar system may use sensors (e.g., sensors 130 in FIG. 1A). In some implementations, these sensors can be single photon sensitive, meaning that they can detect the smallest amount of light possible. While an FM lidar system may, in some applications, use infrared wavelengths (e.g., 950 nm, 1550 nm, etc.), it is not limited to the infrared wavelength range (e.g., near infrared: 800 nm-1500 nm; middle infrared: 1500 nm-5600 nm; and far infrared: 5600 nm-1,000,000 nm). By operating the FM or PM lidar system in infrared wavelengths, the FM or PM lidar system can broadcast stronger light pulses or light beams while meeting eye safety standards. Conventional lidar systems are often not single photon sensitive and/or only operate in near infrared wavelengths, requiring them to limit their light output (and distance detection capability) for eye safety reasons.

Thus, by detecting an object at greater distances, an FM lidar system may have more time to react to unexpected obstacles. Indeed, even a few milliseconds of extra time could improve safety and comfort, especially with heavy vehicles (e.g., commercial trucking vehicles) that are driving at highway speeds.

Another advantage of an FM lidar system is that it provides accurate velocity for each data point instantaneously. In some implementations, a velocity measurement is accomplished using the Doppler effect which shifts frequency of the light received from the object based at least one of the velocity in the radial direction (e.g., the direction vector between the object detected and the sensor) or the frequency of the laser signal. For example, for velocities encountered in on-road situations where the velocity is less than 100 meters per second (m/s), this shift at a wavelength of 1550 nanometers (nm) amounts to the frequency shift that is less than 130 megahertz (MHz). This frequency shift is small such that it is difficult to detect directly in the optical domain. However, by using coherent detection in FMCW, PMCW, or FMQW lidar systems, the signal can be converted to the RF domain such that the frequency shift can be calculated using various signal processing techniques. This enables the autonomous vehicle control system to process incoming data faster.

Instantaneous velocity calculation also makes it easier for the FM lidar system to determine distant or sparse data points as objects and/or track how those objects are moving over time. For example, an FM lidar sensor (e.g., sensors 130 in FIG. 1A) may only receive a few returns (e.g., hits) on an object that is 300 m away, but if those return give a velocity value of interest (e.g., moving towards the vehicle at >70 mph), then the FM lidar system and/or the autonomous vehicle control system may determine respective weights to probabilities associated with the objects.

Faster identification and/or tracking of the FM lidar system gives an autonomous vehicle control system more time to maneuver a vehicle. A better understanding of how fast objects are moving also allows the autonomous vehicle control system to plan a better reaction.

Another advantage of an FM lidar system is that it has less static compared to conventional lidar systems. That is, the conventional lidar systems that are designed to be more light-sensitive typically perform poorly in bright sunlight. These systems also tend to suffer from crosstalk (e.g., when sensors get confused by each other's light pulses or light beams) and from self-interference (e.g., when a sensor gets confused by its own previous light pulse or light beam). To overcome these disadvantages, vehicles using the conventional lidar systems often need extra hardware, complex software, and/or more computational power to manage this "noise."

In contrast, FM lidar systems do not suffer from these types of issues because each sensor is specially designed to respond only to its own light characteristics (e.g., light beams, light waves, light pulses). If the returning light does not match the timing, frequency, and/or wavelength of what was originally transmitted, then the FM sensor can filter (e.g., remove, ignore, etc.) out that data point. As such, FM lidar systems produce (e.g., generates, derives, etc.) more accurate data with less hardware or software requirements, enabling safer and smoother driving.

Lastly, an FM lidar system is easier to scale than conventional lidar systems. As more self-driving vehicles (e.g., cars, commercial trucks, etc.) show up on the road, those powered by an FM lidar system likely will not have to contend with interference issues from sensor crosstalk. Furthermore, an FM lidar system uses less optical peak power than conventional lidar sensors. As such, some or all of the optical components for an FM lidar can be produced on a single chip, which produces its own benefits, as discussed herein.

3. Commercial Trucking

Figure 1B:
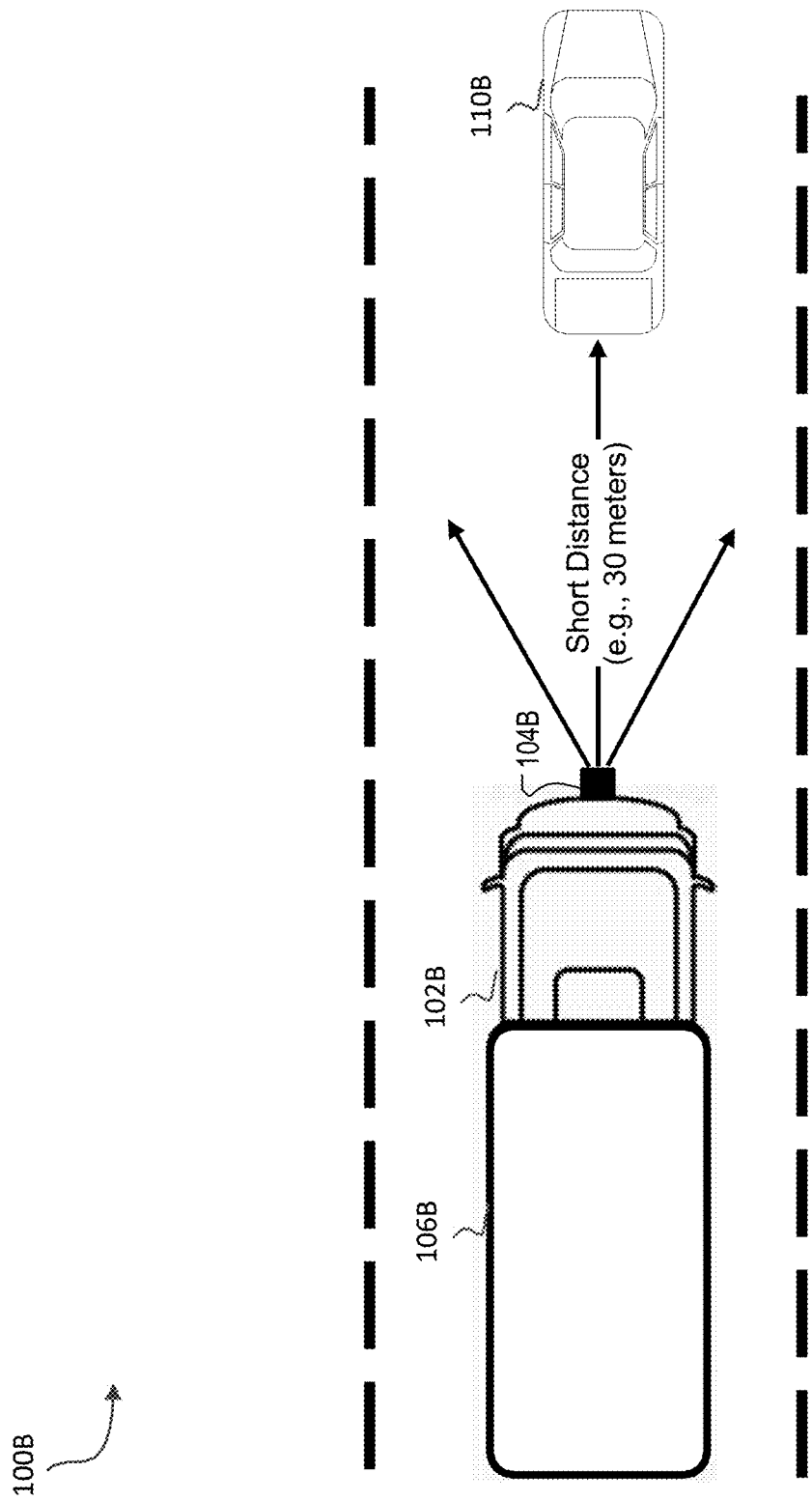
FIG. 1B is a block diagram illustrating an example of a system environment for autonomous commercial trucking vehicles, according to some implementations.

FIG. 1B is a block diagram illustrating an example of a system environment for autonomous commercial trucking vehicles, according to some implementations. The environment 100B includes a commercial truck 102B for hauling cargo 106B. In some implementations, the commercial truck 102B may include vehicles configured to long-haul freight transport, regional freight transport, intermodal freight transport (i.e., in which a road-based vehicle is used as one of multiple modes of transportation to move freight), and/or any other road-based freight transport applications. The commercial truck 102B may be a flatbed truck, a refrigerated truck (e.g., a reefer truck), a vented van (e.g., dry van), a moving truck, etc. The cargo 106B may be goods and/or produce. The commercial truck 102B may include a trailer to carry the cargo 106B, such as a flatbed trailer, a lowboy trailer, a step deck trailer, an extendable flatbed trailer, a sidekit trailer, etc.

The environment 100B includes an object 110B (shown in FIG. 1B as another vehicle) that is within a distance range that is equal to or less than 30 meters from the truck.

The commercial truck 102B may include a lidar system 104B (e.g., an FM lidar system, vehicle control system 120 in FIG. 1A, lidar system 201 in FIG. 2) for determining a distance to the object 110B and/or measuring the velocity of the object 110B. Although FIG. 1B shows that one lidar system 104B is mounted on the front of the commercial truck 102B, the number of lidar system and the mounting area of the lidar system on the commercial truck are not limited to a particular number or a particular area. The commercial truck 102B may include any number of lidar systems 104B (or components thereof, such as sensors, modulators, coherent signal generators, etc.) that are mounted onto any area (e.g., front, back, side, top, bottom, underneath, and/or bottom) of the commercial truck 102B to facilitate the detection of an object in any free-space relative to the commercial truck 102B.

As shown, the lidar system 104B in environment 100B may be configured to detect an object (e.g., another vehicle, a bicycle, a tree, street signs, potholes, etc.) at short distances (e.g., 30 meters or less) from the commercial truck 102B.

Figure 1C:
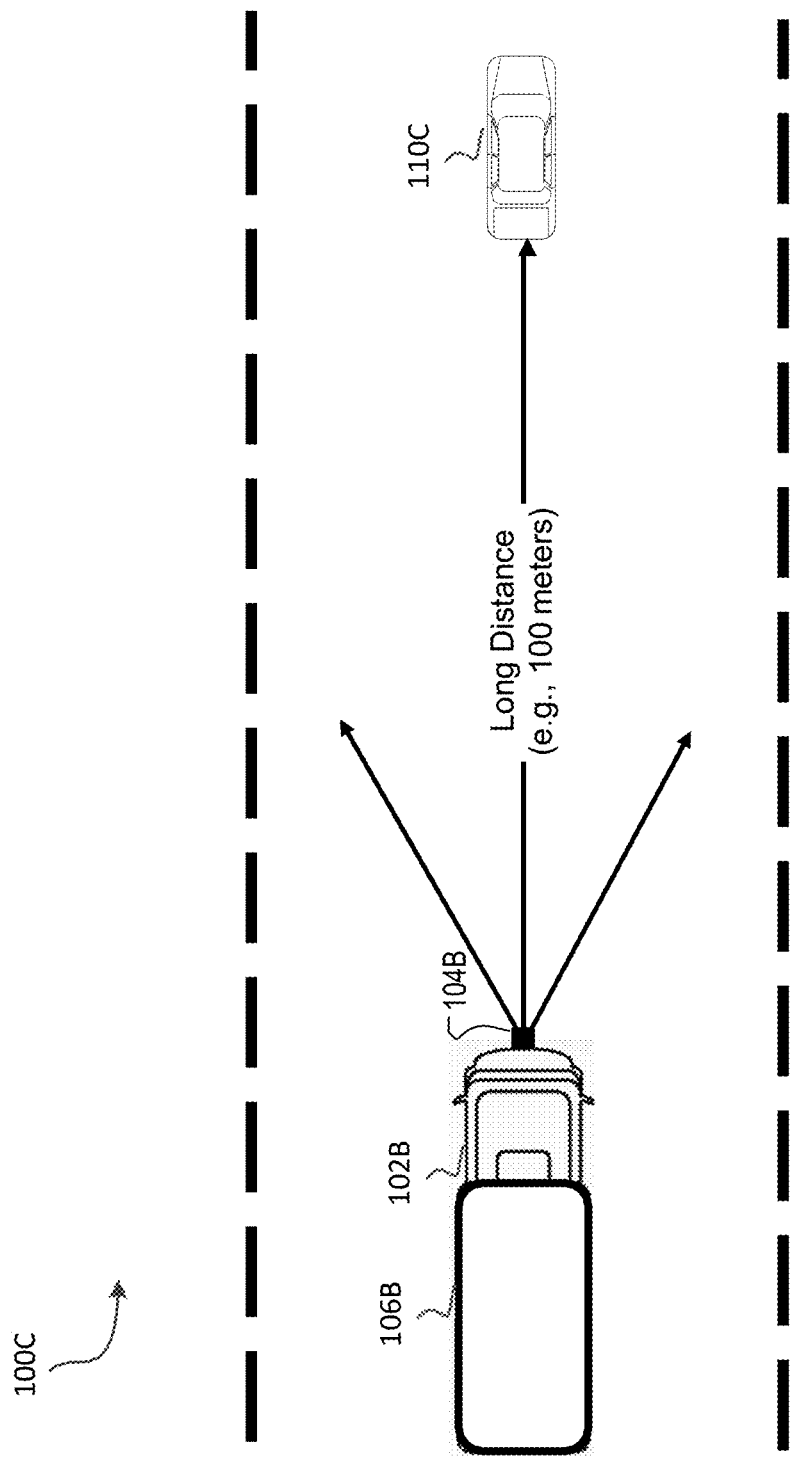
FIG. 1C is a block diagram illustrating an example of a system environment for autonomous commercial trucking vehicles, according to some implementations.

FIG. 1C is a block diagram illustrating an example of a system environment for autonomous commercial trucking vehicles, according to some implementations. The environment 100C includes the same components (e.g., commercial truck 102n, cargo 106n, lidar system 104n, etc.) that are included in environment 100B.

The environment 100C includes an object 110C (shown in FIG. 1C as another vehicle) that is within a distance range that is (i) more than 30 meters and (ii) equal to or less than 150 meters from the commercial truck 102B. As shown, the lidar system 104B in environment 100C may be configured to detect an object (e.g., another vehicle, a bicycle, a tree, street signs, potholes, etc.) at a distance (e.g., 100 meters) from the commercial truck 102B.

Figure 1D:
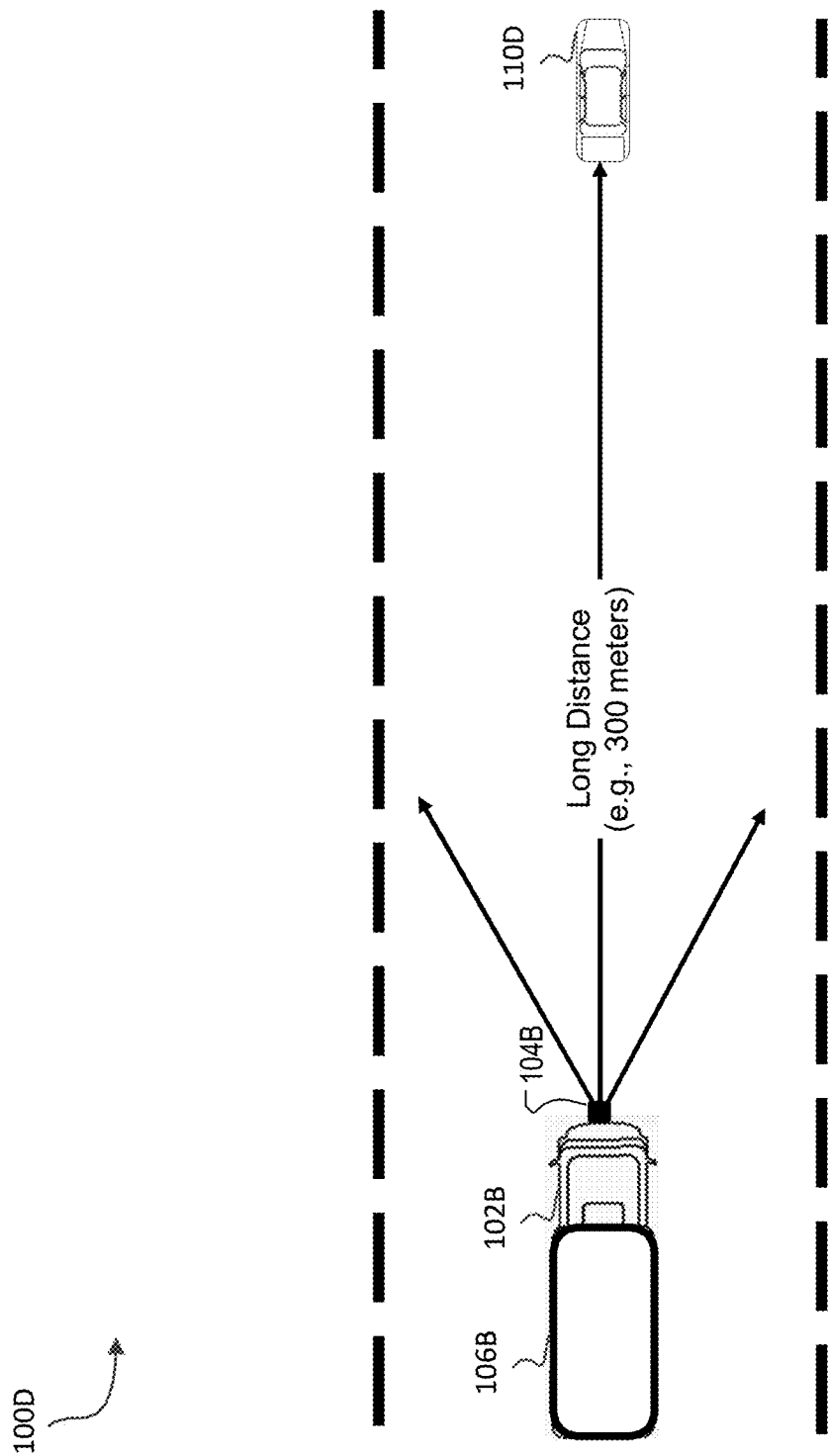
FIG. 1D is a block diagram illustrating an example of a system environment for autonomous commercial trucking vehicles, according to some implementations.

FIG. 1D is a block diagram illustrating an example of a system environment for autonomous commercial trucking vehicles, according to some implementations. The environment 100D includes the same components (e.g., commercial truck 102n, cargo 106n, lidar system 104n, etc.) that are included in environment 100B.

The environment 100D includes an object 110D (shown in FIG. 1D as another vehicle) that is within a distance range that is more than 150 meters from the commercial truck 102B. As shown, the lidar system 104B in environment 100D may be configured to detect an object (e.g., another vehicle, a bicycle, a tree, street signs, potholes, etc.) at a distance (e.g., 300 meters) from the commercial truck 102B.

In commercial trucking applications, it is important to effectively detect objects at all ranges due to the increased weight and, accordingly, longer stopping distance required for such vehicles. FM lidar systems (e.g., FMCW and/or FMQW systems) or PM lidar systems are well-suited for commercial trucking applications due to the advantages described above. As a result, commercial trucks equipped with such systems may have an enhanced ability to safely move both people and goods across short or long distances, improving the safety of not only the commercial truck but of the surrounding vehicles as well. In various implementations, such FM or PM lidar systems can be used in semi-autonomous applications, in which the commercial truck has a driver and some functions of the commercial truck are autonomously operated using the FM or PM lidar system, or fully autonomous applications, in which the commercial truck is operated entirely by the FM or lidar system, alone or in combination with other vehicle systems.

4. Continuous Wave Modulation and Quasi-Continuous Wave Modulation

In a lidar system that uses CW modulation, the modulator modulates the laser light continuously. For example, if a modulation cycle is 10 seconds, an input signal is modulated throughout the whole 10 seconds. Instead, in a lidar system that uses quasi-CW modulation, the modulator modulates the laser light to have both an active portion and an inactive portion. For example, for a 10 second cycle, the modulator modulates the laser light only for 8 seconds (sometimes referred to as, "the active portion"), but does not modulate the laser light for 2 seconds (sometimes referred to as, "the inactive portion"). By doing this, the lidar system may be able to reduce power consumption for the 2 seconds because the modulator does not have to provide a continuous signal.

In Frequency Modulated Continuous Wave (FMCW) lidar for automotive applications, it may be beneficial to operate the lidar system using quasi-CW modulation where FMCW measurement and signal processing methodologies are used, but the light signal is not in the on-state (e.g., enabled, powered, transmitting, etc.) all the time. In some implementations, Quasi-CW modulation can have a duty cycle that is equal to or greater than 1% and up to 50%. If the energy in the off-state (e.g., disabled, powered-down, etc.) can be expended during the actual measurement time then there may be a boost to signal-to-noise ratio (SNR) and/or a reduction in signal processing requirements to coherently integrate all the energy in the longer time scale.

5. LIDAR System for Autonomous Vehicles

FIG. 2 is a block diagram illustrating an example environment of a lidar system for autonomous vehicles, according to some implementations. The environment 200 includes a lidar system 201 that includes a transmit (Tx) path and a receive (Rx) path. The Tx path includes one or more Tx input ports and/or one or more Tx output ports (not shown in FIG. 2) and the Rx path includes one or more Rx input ports and/or one or more Rx output ports (not shown in FIG. 2).

In some implementations, a semiconductor substrate and/or semiconductor package may include the Tx path and the Rx. In some implementations, the semiconductor substrate and/or semiconductor package may include at least one of silicon photonics circuitry, photonic lightwave circuit (PLC), or III-V semiconductor circuitry.

In some implementations, a first semiconductor substrate and/or a first semiconductor package may include the Tx path and a second semiconductor substrate and/or a second semiconductor package may include the Rx path. In some arrangements, the Rx input ports, RX output ports, the Tx input ports, and/or the TX output ports may occur (or be formed, disposed, located, or placed) along one or more edges of one or more semiconductor substrates and/or semiconductor packages.

In some implementations, a semiconductor substrate and/or semiconductor package may include a transceiver device 250 which includes at least a transmitter 220 and a receiver 222. The transmitter 220 may include at least one of a transmit (Tx) waveguide, a fiber array, or a grating coupler. The receiver 222 may include at least one of a receive (Rx) waveguide, a fiber array, or a grating coupler. In some implementations, the semiconductor substrate and/or semiconductor package for the transceiver device 250 may include at least one of silicon photonics circuitry, photonic lightwave circuit (PLC), or III-V semiconductor circuitry. In some implementations, the transceiver device 250 may be a chip or integrated circuit including at least one of silicon photonics circuitry, photonic lightwave circuit (PLC), or III-V semiconductor circuitry. In some implementations, each of the transmitter 220 and the receiver may be a layer of the chip or integrated circuit.

The environment 200 includes one or more optics 210 (e.g., an oscillatory scanner, a unidirectional scanner, a Risley prism, a circulator optic, and/or a beam collimator, etc.) that are coupled to the lidar system 201. In some implementations, the one or more optics 210 may be coupled to the Tx path via the one or more Tx input ports and/or one or more TX output ports. In some implementations, the one or more optics 210 may be coupled to the Rx path via the one or more Rx input/output ports.

The environment 200 includes a vehicle control system 120 (e.g., vehicle control system 120 in FIG. 1) that is coupled to the lidar system 201. In some implementations, the vehicle control system 120 may be coupled to the Rx path via the one or more Rx input ports and/or one or more RX output ports.

The Tx path may include a laser source 202, a modulator 204A, a modulator 204B, an amplifier 206, and the transmitter 220. The Rx path may include the receiver 222, a mixer 208, a detector 212, and a transimpedance amplifier (TIA) 214. Although FIG. 2 shows only a select number of components and only one input/output channel; the environment 200 may include any number of components and/or input/output channels (in any combination) that are interconnected in any arrangement to facilitate combining multiple functions of a lidar system, to support the operation of a vehicle.

The laser source 202 may be configured to generate a light signal (or beam) that is derived from (or associated with) a local oscillator (LO) signal. In some implementations, the light signal may have an operating wavelength that is equal to or substantially equal to 1550 nanometers. In some implementations, the light signal may have an operating wavelength that is between 1400 nanometers and 1400 nanometers.

The laser source 202 may be configured to provide the light signal to the modulator 204A, which is configured to modulate a phase and/or a frequency of the light signal based on a first radio frequency (RF) signal (shown in FIG. 2 as, "RF1") and using Continuous Wave (CW) modulation or quasi-CW modulation to generate a modulated light signal. The modulator 204A may be configured to send the modulated light signal to the amplifier 206. The amplifier 206 may be configured to amplify the modulated light signal to generate an amplified light signal to the optics 210 via the transmitter 220.

The optics 210 may be configured to steer the amplified light signal that it receives from the Tx path into an environment within a given field of view toward an object 218, may receive a returned signal reflected back from the object 218, and provide the returned signal to the mixer 208 of the Rx path via the receiver 222.

The laser source 202 may be configured to provide the LO signal to the modulator 204B, which is configured to modulate a phase and/or a frequency of the LO signal based on a second RF signal (shown in FIG. 2 as, "RF2") and using Continuous Wave (CW) modulation or quasi-CW modulation to generate a modulated LO signal and send the modulated LO signal to the mixer 208 of the Rx path.

The mixer 208 may be configured to mix (e.g., combine, multiply, etc.) the modulated LO signal with the returned signal to generate a down-converted signal and send the down-converted signal to the detector 212. In some arrangements, the mixer 208 may be configured to send the modulated LO signal to the detector 212.

The detector 212 may be configured to generate an electrical signal based on the down-converted signal and send the electrical signal to the TIA 214. In some arrangements, the detector 212 may be configured to generate an electrical signal based on the down-converted signal and the modulated signal.

The TIA 214 may be configured to amplify the electrical signal and send the amplified electrical signal to the vehicle control system 120. In some implementations, the TIA 214 may have a peak noise-equivalent power (NEP) that is less than 5 picoWatts per square root Hertz (i.e., $5 \times 10^{-12}$ Watts per square root Hertz). In some implementations, the TIA 214 may have a gain between 4 kiloohms and 25 kiloohms. In some implementations, detector 212 and/or TIA 214 may have a 3 decibel bandwidth between 80 kilohertz (kHz) and 450 megahertz (MHz). The vehicle control system 120 may be configured to determine a distance to the object 218 and/or measures the velocity of the object 218 based on the one or more electrical signals that it receives from the TIA.

In some implementations, modulator 204A and/or modulator 204B may have a bandwidth between 400 megahertz (MHz) and 1000 (MHz). In some implementations, the modulator 204A may be configured to send a first modulated light (optical) signal and a second modulated light (optical) signal to the amplifier 206. The amplifier 206 may be configured to amplify the first and second modulated light signals to generate amplified light signals to the optics 210. The optics 210 may be configured to steer the first and second modulated light signals that it receives from the Tx path into an environment within a given field of view toward an object 218, may receive corresponding first and second returned signals reflected back from the object 218, and provide the first and second returned signals to the mixer 208 of the Rx path. The modulator 204B may be configured to generate (1) a first modulated LO signal associated with the first modulated light signal and (2) a second modulated LO signal associated with the second modulated light signal, and send the first and second modulated LO signals to the mixer 208 of the Rx path. The mixer 208 may be configured to pair (e.g., associate, link, identify, etc.) the first returned light signal and the first modulated LO signal, and mix (e.g., combine, multiply, etc.) the first returned light signal and the first modulated LO signal to generate a first down-converted signal and send the first down-converted signal to the detector 212. Similarly, the mixer 208 may be configured to pair the second returned light signal and the second modulated LO signal, and mix the second returned light signal and the second modulated LO signal to generate a second down-converted signal and send the second down-converted signal to the detector 212. The detector 212 may be configured to generate first and second electrical signals based on the first and second down-converted signal, respectively. The vehicle control system 120 may be configured to determine a distance to the object 218 and/or measures the velocity of the object 218 based on the first and second electrical signals, received via TIA 214.

6. A LIDAR System Including a Bistatic Transceiver

Figure 6:
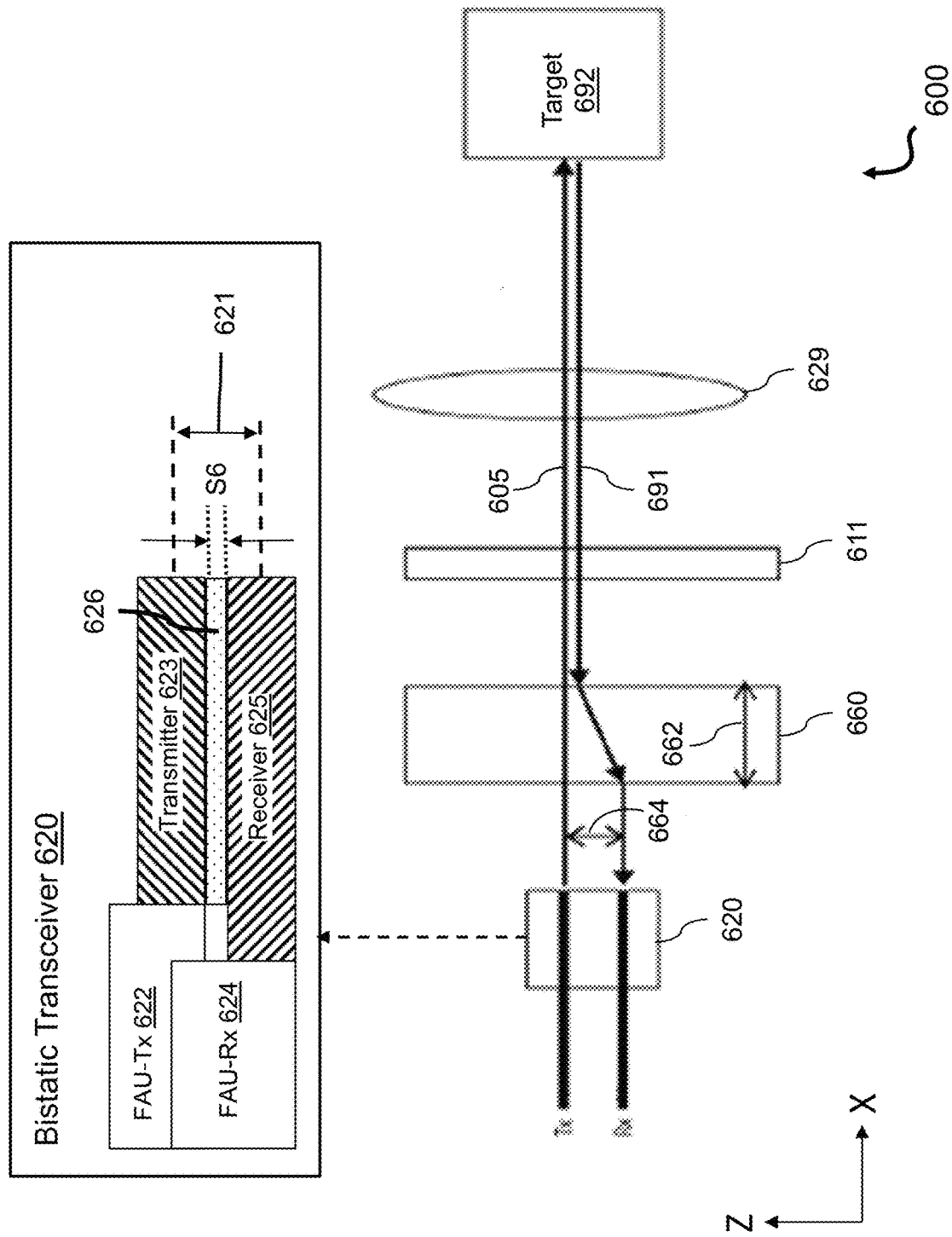
FIG. 6 is a block diagram illustrating an example of a lidar system including a bistatic transceiver, according to some implementations.

In designing and implementing a bistatic transceiver, there may be constraints in an arrangement of a transmitter (e.g., Tx waveguide or Tx grating coupler) and a receiver (e.g., Rx waveguide or Rx grating coupler). One constraint is a distance or spacing between a transmitter and a receiver. In some cases, in a bistatic transceiver, the transmitter and the receiver may need be adjacent because optical components are configured such that a Tx beam and a returned Rx beam are spaced from each other by a small distance. In some configurations as shown in FIG. 6, a birefringent displacer (e.g., birefringent displacer 660) displaces one of a Tx beam or an Rx beam, after the displacement, the Tx beam is separated from the Rx beam by a distance in a range from about 100 μm to about 150 μm. Accordingly, the transmitter and a receiver may need be spaced from each other with a spacing that is less than the distance between the Tx beam and the Rx beam.

Figure 3A:
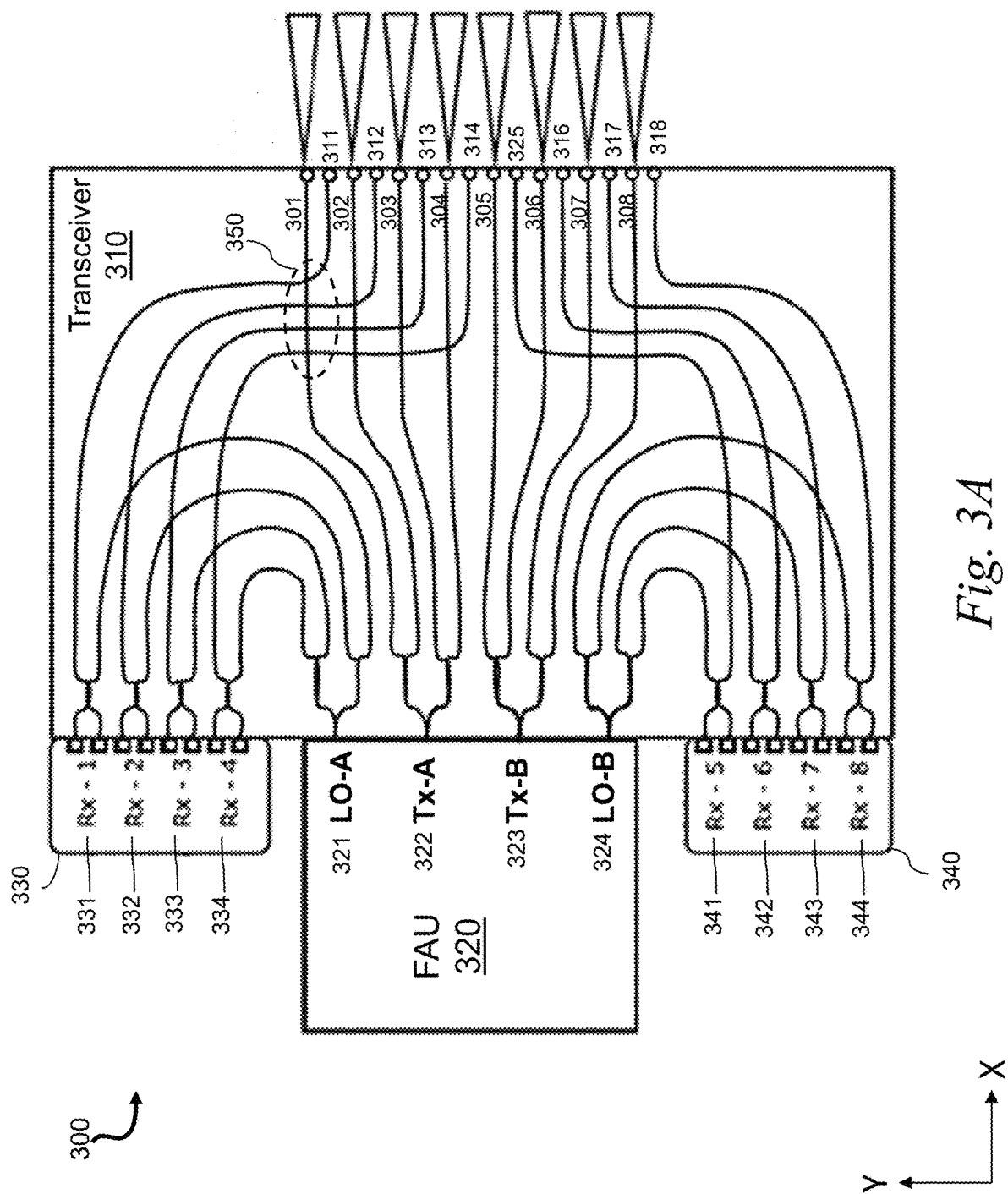
FIG. 3A and FIG. 3B are block diagrams illustrating an example configuration of a transceiver according to some implementations.
Figure 3B:
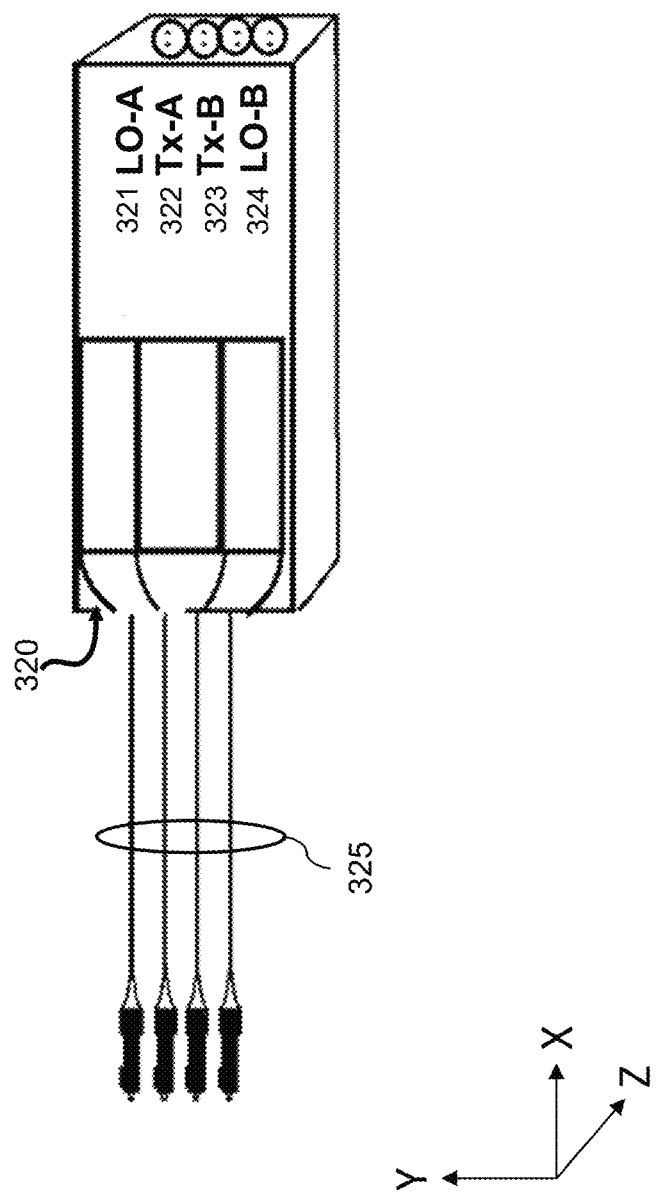

This small spacing can cause electromagnetic interference or crosstalk between the transmitter and the receiver. For example, a beam transmitted in a channel on the transmitter may create an undesired effect on signals or beams in the receiver or channels thereof. FIG. 3A and FIG. 3B show an example configuration of a transceiver where interference or crosstalk may be induced. FIG. 3A and FIG. 3B are block diagrams illustrating an example configuration 300 of a transceiver according to some implementations. The configuration 300 includes a coherent LIDAR transceiver 310 and detector devices 330, 340. The detector device 330 may include detectors 331, 332, 333, 334. The detector device 340 may include detectors 341, 342, 343, 344. A laser source (e.g., laser 202 in FIG. 2) generates an LO signal via a Tx path and provides the LO signal to an LO input 321 (shown in FIG. 3A as, "LO-A"). The laser source provides an LO signal to another LO input 324 (shown in FIG. 3A as, "LO-B") in a similar manner. The coherent LIDAR transceiver 310 may split the LO signal received at the LO input LO-A into LO signals to be provided to the detectors 331-334. Similarly, the transceiver 310 may split the LO signal received at the LO input LO-B into LO signals to be provided to the detectors 341-344.

The laser source generates a light signal via a Tx path (e.g., the Tx path in FIG. 2) and provides the light signal to a Tx input 322 (shown in FIG. 3A as, "Tx-A"). The laser source provides a light signal to a Tx input 323 (shown in FIG. 3A as, "Tx-B") in a similar manner. The coherent LIDAR transceiver 301 splits the light signal received at the Tx input 322 into light signals to be transmitted into free space (towards one or more objects) via Tx outputs 301, 302, 303, 304. Similarly, the transceiver 301 splits the light signal received at the Tx input 323 into light signals to be transmitted into free space (towards one or more objects) via Tx outputs 305, 306, 307, 308

In response to transmitting the light signals transmitted into free space via the Tx outputs 301, 302, 303, 304, the coherent LIDAR transceiver 310 may receive the returned lights reflected back from an object via Rx inputs 311, 312, 313, 314, and provides the returned lights and corresponding LO signals to the detector 331, 332, 333, 334, respectively. The detectors generate electrical signals based on the returned lights and/or the corresponding LO signals. Similarly, in response to transmitting the light signals transmitted into free space via the Tx outputs 305, 306, 307, 308, the transceiver 310 may receive the returned lights reflected back from an object via Rx inputs 315, 316, 317, 318, and provides the returned lights and corresponding LO signals to the detector 341, 342, 343, 344, respectively.

FIG. 3B is a block diagram illustrating an example configuration of a fiber array for providing light signals to a LIDAR system, according to some implementations. The environment includes fiber coupling 325 (e.g., a collection of fiber cables) and a fiber array or fiber array unit (FAU) 320. The fiber coupling receives light signals from a laser source and provides the light signals to the fiber array. The fiber array 320 includes a plurality of output channels that are arranged in the following order: LO-A 321, Tx-A 322, Tx-B 323, LO-B 324. Each output channel is respectively mapped to an internal path (not shown in FIG. 3B) of the fiber array 320, which are each mapped to a respective fiber cable of the fiber coupling 325.

Referring to FIG. 3A and FIG. 3B, Rx optical paths and/or LO optical paths may cross (e.g., overlap, intersect, traverse) Tx optical paths at a crossing point (sometimes referred to as a "perpendicular crossing point" or "orthogonal crossing point"). For example, FIG. 3A shows a crossing point 350, where interference or crosstalk are likely induced. Photonic integrated circuits (PICs) are nowadays extensively used so that a PIC transceiver may include a number of crossing points. Therefore, there is a need for a PIC transceiver module or a PIC transceiver device to effectively mitigate interference or crosstalk between a transmitter and a receiver.

To solve these problem, in some implementations, according to certain aspects, embodiments in the present disclosure relate to techniques for manufacturing a bistatic transceiver including a transmitter (e.g., transmitter layer) and a receiver (e.g., receiver layer), to mitigate interference and/or crosstalk between the transmitter and the receiver in which crosstalk may be induced by crossings or crossing points (e.g., crossings in a PLC device) whether the crossings are perpendicular or not. A bistatic transceiver may be manufactured or configured to vertically decouple or functionally separate high power optical beams (e.g., Tx beams transmitted on the transmitter) from low power optical beams (e.g., Rx beams and/or LO signals on the receiver) to mitigate a risk of crosstalk of the high-power beams. The transmitter and the receiver may be functionally separated out or vertically decoupled to mitigate the risk of interference and/or crosstalk.

The transmitter may include at least one of a Tx waveguide or a Tx grating coupler or any other optical transmitter. The receiver may include at least one of a Rx waveguide or a Rx grating coupler or any other optical receiver. In some implementations, the bistatic transceiver may include at least one of silicon photonics circuitry, PLC, or III-V semiconductor circuitry. The transmitter may include a splitter, e.g., 2×8 splitter or 4×16 splitter, thereby transmitting multiple beams through multiple Tx channels. The receiver may receive multiple beams through multiple Rx channels (e.g., 8 beams or 16 beams; the same number of beams as the number of beams the transmitter can transmit). The transceiver may transmit or receive linearly polarized beams.

In some implementations, the transmitter and the receiver may be manufactured, packaged, or integrated in a chip or integrated circuit level. For example, a bistatic transceiver may be implemented in a single chip or integrated circuit. In some implementations, each of the transmitter and the receiver may be a layer of a single chip or integrated circuit. In some implementations, a transmitter and a receiver may be manufactured and/or packaged in a wafer level. In some implementations, each of the transmitter and the receiver may be a layer of a wafer-level packaging.

In some implementations, in a bistatic transceiver, the transmitter and the receiver may be vertically split up into separate layers and sandwich or interpose an adhesive therebetween. A material of the adhesive may include at least one of SU-8, benzocyclobutene (BCB), polyimide, epoxy, acrylic or phenol butyral.

The bistatic transceiver may be manufactured by stacking one of a transmitter layer (e.g., Tx waveguide layer) or a receiver layer (e.g., Rx waveguide layer) on top of each other with a spacing, resulting in a dual layer structure. In some implementations, the spacing may be in a range of 40 μm to 125 μm. In some implementations, the spacing may be in a range of 40 μm to 100 μm. If the spacing is too small, e.g., less than 40 μm, interference and/or crosstalk may be induced. If the spacing is too large, e.g., greater than 125 μm, the bistatic transceiver may not meet a constraint and/or requirement of displacement between the transmitter and the receiver, configured by optical components, so that the transceiver may not be integrated with the optical components.

In some implementations, the length of a bistatic transceiver in a length direction (e.g., X direction) may be in a range of 15 mm to 20 mm. The height of the bistatic transceiver in a depth direction (e.g., Z direction) may be in a range of 6 mm to 8 mm (for example, 7 mm). In some implementations, the transmitter layer and the receiver layer may be aligned such that on a plan view (e.g., in X-Y plane) an edge of the transmitter layer and an edge of the receiver layer are parallel to each other. In some implementations, the length of the receiver layer (e.g., in X direction) may be longer than that of the transmitter layer.

In some implementations, a Tx fiber array may be coupled to inputs of the transmitter layer and a Rx fiber array may be coupled to inputs of the receiver layer. At least one of the Tx fiber array or the Rx fiber array may be a fiber array unit (FAU). The inputs of the transmitter layer may be Tx inputs. The inputs of the receiver layer may be LO inputs. In some implementations, on a plan view (e.g., on X-Y plane) the Tx fiber array and the Rx fiber array may not overlap each other vertically (e.g., in Z direction). In some implementations, on the plan view, the Rx fiber array may include a first Rx fiber array and a second Rx fiber array, both extending in the length direction and spaced from each other in the width direction. On the plan view, the Tx fiber array may be sandwiched or interposed between the first Rx fiber array and the second Rx fiber array in the width direction (e.g., Y direction). In some implementations, on the plan view, the Tx fiber array may vertically overlap the receiver layer in a horizontal portion.

In some implementations, a bottom surface of the Tx fiber array may be located at the same level or above a top surface of the receiver layer in the depth direction (e.g., Z direction). The Tx fiber array and the Rx fiber array may at least partially overlap each other in the width direction (e.g., Y direction). The height (or depth) of the Tx fiber array may be greater than or equal to the transmitter layer. The height (or depth) of the Rx fiber array may be greater than or equal to the receiver layer.

In some implementations, the transmitter layer and the receiver layer may be actively aligned. For example, the transceiver is powered to find an alignment between a PLC transmitter layer and a PLC receiver layer on a plan view (X-Y plane). In some implementations, each of the transmitter layer and the receiver layer may be a chip or an integrated circuit (e.g., PLC chip), and the transmitter chip and the receiver chip may be actively aligned. In some implementations, the bistatic transceiver may be manufactured, packaged, or integrated in a printed circuit board assembly (PCBA).

In some implementations, a horizontal arrangement of a Tx fiber array and an Rx fiber array may be performed by horizontally (e.g., on X-Y plane) separating the Tx fiber array and the Rx fiber array. In some implementations, the Tx fiber array and the Rx fiber array may be horizontally separated by horizontally separating Tx paths (on the transmitter layer) and Rx paths (on the receiver layer). The Tx fiber array may be only connected to the transmitter layer (e.g., upper layer) in a first horizontal portion where Tx optical paths are disposed, while the Rx fiber array may be connected to the receiver layer (e.g., lower layer) in a second horizontal portion that does not vertically overlap the first horizontal portion.

In some implementations, one FAU may include a plurality of fiber arrays with different depths or heights. For example, a first fiber array of an FAU with a first depth may be connected to a upper layer (e.g., transmitter layer) while a second fiber array of the same FAU with a second depth smaller than the first depth may be connected to a lower layer (e.g., receiver layer).

According to certain aspects, implementations in the present disclosure relate to a lidar system for a vehicle including a receiver layer, a transmitter layer stacked on or coupled to the receiver layer through an adhesive layer in a first direction, the adhesive layer being interposed between the transmitter layer and the receiver layer, and one or more optics. The transmitter layer may receive, at a first side of the transmitter layer, a transmit signal from a laser source, and transmit the transmit signal through the one or more optics. The receiver layer may receive, through the one or more optics, a return signal reflected by an object in an environment of the vehicle, and output the return signal at a first side of the receiver layer. The first side of the transmitter layer and the first side of the receiver layer may be apart from and/or parallel to each other in a second direction crossing the first direction.

In some implementations, the receiver layer has a dimension greater than that of the transmitter layer in the second direction. In some implementations, each of the receiver layer and the transmitter layer includes at least one of silicon photonics circuitry, photonic lightwave circuit (PLC), or III-V semiconductor circuitry. The receiver layer, the adhesive layer, and the transmitter layer may be manufactured, packaged, or integrated in an integrated circuit (IC).

In some implementations, the transmitter layer may include one or more splitters and a plurality of transmit (Tx) channels at a second side of the transmitter layer, the second side facing the one or more optics. The transmitter layer may be configured to split the transmit signal into a plurality of transmit signals using the one or more splitters, and transmit the plurality of transmit signals through the plurality of Tx channels, respectively.

In some implementations, the receiver layer may include a plurality of receive (Rx) channels at a second side of the receiver layer, the second side facing the one or more optics. The return signal may include a plurality of return signals. The receiver layer may be configured to receive the plurality of return signals through the plurality of Rx channels, respectively.

In some implementations, the lidar system may further include one or more fiber arrays including one or more transmit (Tx) fiber cables and one or more receive (Rx) fiber cables. The one or more Tx fiber cables may be coupled to the first side of the transmitter layer and configured to provide the transmit signal to the transmitter layer. The one or more Rx fiber cables may be coupled to the first side of the receiver layer and configured to provide a local oscillator (LO) signal to the receiver layer. The one or more Tx fiber cables and the one or more Rx fiber cables do not overlap in the first direction.

In some implementations, the one or more Rx fiber cables may include a first set of Rx fiber cables and a second set of Rx fiber cables. The one or more Tx fiber cables may be interposed between the first set of Rx fiber cables and the second set of Rx fiber cables in a third direction crossing the first direction and the second direction.

In some implementations, the one or more Tx fiber cables may overlap at least a portion of the receiver layer in the first direction. The one or more Rx fiber cables do not overlap the transmitter layer in the first direction.

In some implementations, the lidar system may further include the one or more Tx fiber arrays coupled to the first side of the transmitter layer and configured to provide the transmit signal to the transmitter layer, and one or more Rx fiber arrays coupled to the first side of the receiver layer and configured to provide an LO signal to the receiver layer. The one or more Tx fiber arrays and the one or more Rx fiber arrays do not overlap in the first direction.

In some implementations, the one or more Rx fiber arrays may include a first Rx fiber array and a second Rx fiber array. The one or more Tx fiber arrays may be interposed between the first Rx fiber array and the second Rx fiber array in a third direction crossing the first direction and the second direction.

In some implementations, the one or more Tx fiber arrays may have one or more fiber cables overlapping at least a portion of the receiver layer in the first direction. The one or more Rx fiber arrays do not have a fiber cable overlapping the transmitter layer in the first direction.

In some implementations, a spacing between the transmitter layer and the receiver layer in the first direction may be greater than or equal to 40 micrometers and smaller than 125 micrometers. In some implementations, the one or more optics may include an optical displacer configured to spatially separate the transmit signal and the return signal by a distance. The displacer may be a single optic. In some implementations, the one or more optics may include an optical circulator which may be an assembly of optics. The optical circulator may be configured to spatially separate the transmit signal and the return signal by a distance. A spacing between the transmitter layer and the receiver layer in the first direction is smaller than the distance.

In some implementations, the distance may be greater than or equal to 100 micrometers and smaller than 150 micrometers.

Various implementations in the present disclosure have one or more of the following advantages and benefits.

First, implementations in the present disclosure can provide useful techniques for mitigating a risk of crosstalk from crossings or a crossing point where multiple Tx channels or Tx optical paths on a transmitter cross over Rx channels or Rx optical paths on a receiver. In some implementations, the transmitter and the receiver may be separated out or decoupled from each other by a dual layer structure in which each of the transmitter and the receiver is a layer of the bistatic transceiver. In some implementations, a Tx fiber array connected or coupled to the transmitter and an Rx fiber array connected or coupled to the receiver may not vertically overlap each other, thereby mitigating a risk of crosstalk of high power Tx optical signals.

Second, implementations in the present disclosure can provide useful techniques for effectively packaging and/or integrating a bistatic transceiver with optical components. For example, a bistatic transceiver including a transmitter layer and a receiver layer can be manufactured such that a spacing by which the two layers are spaced out is in a range that satisfies a constraint and/or requirement configured by optical components. In some implementations, the spacing may be in a range of 40 μm to 125 μm. In some implementations, the spacing may be in a range of 40 μm to 100 μm.

Third, implementations in the present disclosure can provide useful techniques for effectively packaging, integrating, or aligning fiber arrays and a bistatic transceiver which includes at least one of at least one of silicon photonics circuitry, photonic lightwave circuit (PLC), or III-V semiconductor circuitry. In case where each of the transmission layer and the receiver layer of the bistatic transceiver is a chip or integrated circuit, the transmission layer chip and the receiver layer chip may be actively aligned for integration with a Tx fiber array and an Rx fiber array.

Figure 4A:
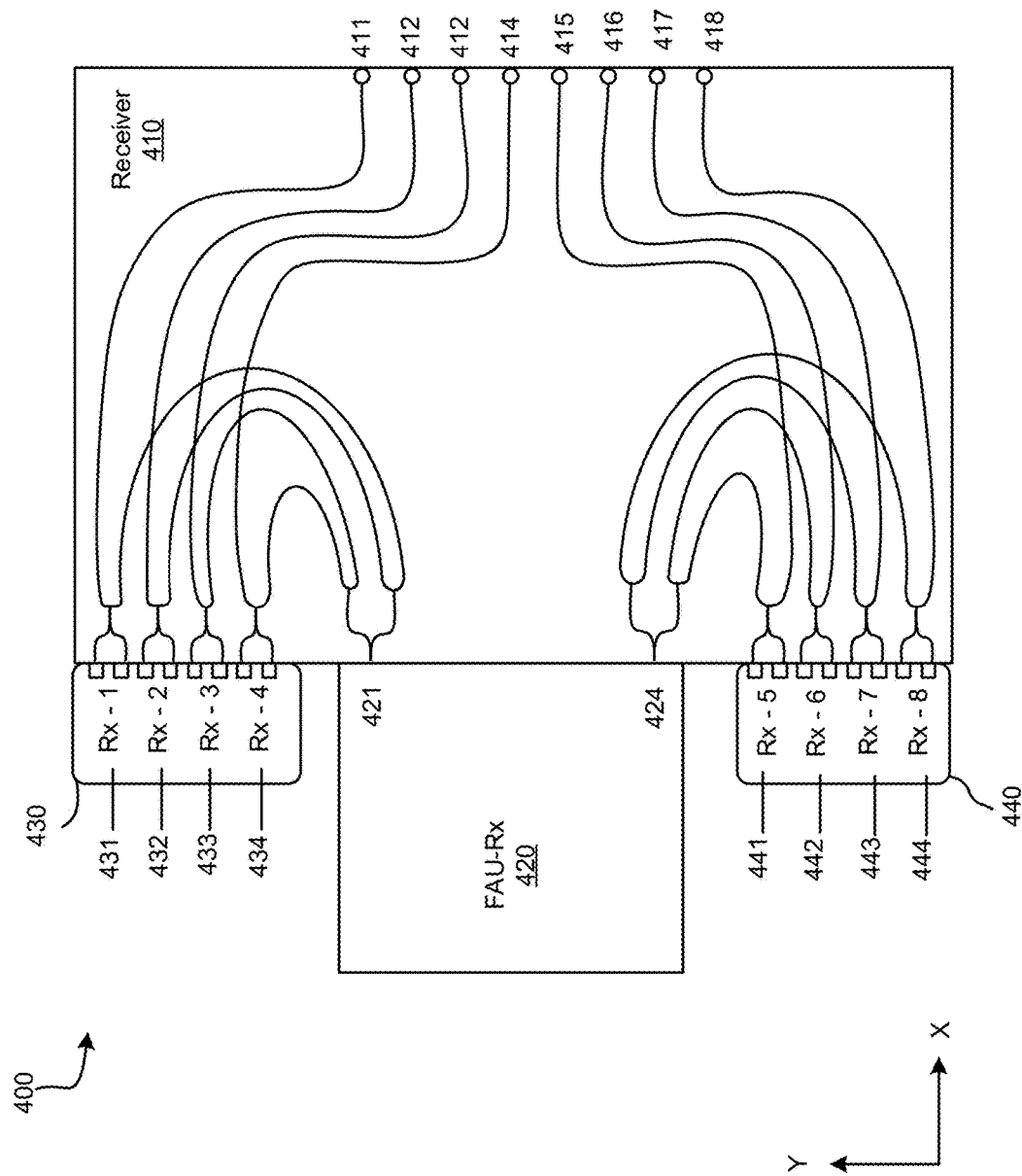
FIG. 4A and FIG. 4B are block diagrams illustrating an example configuration of a bistatic transceiver according to some implementations.
Figure 4B:
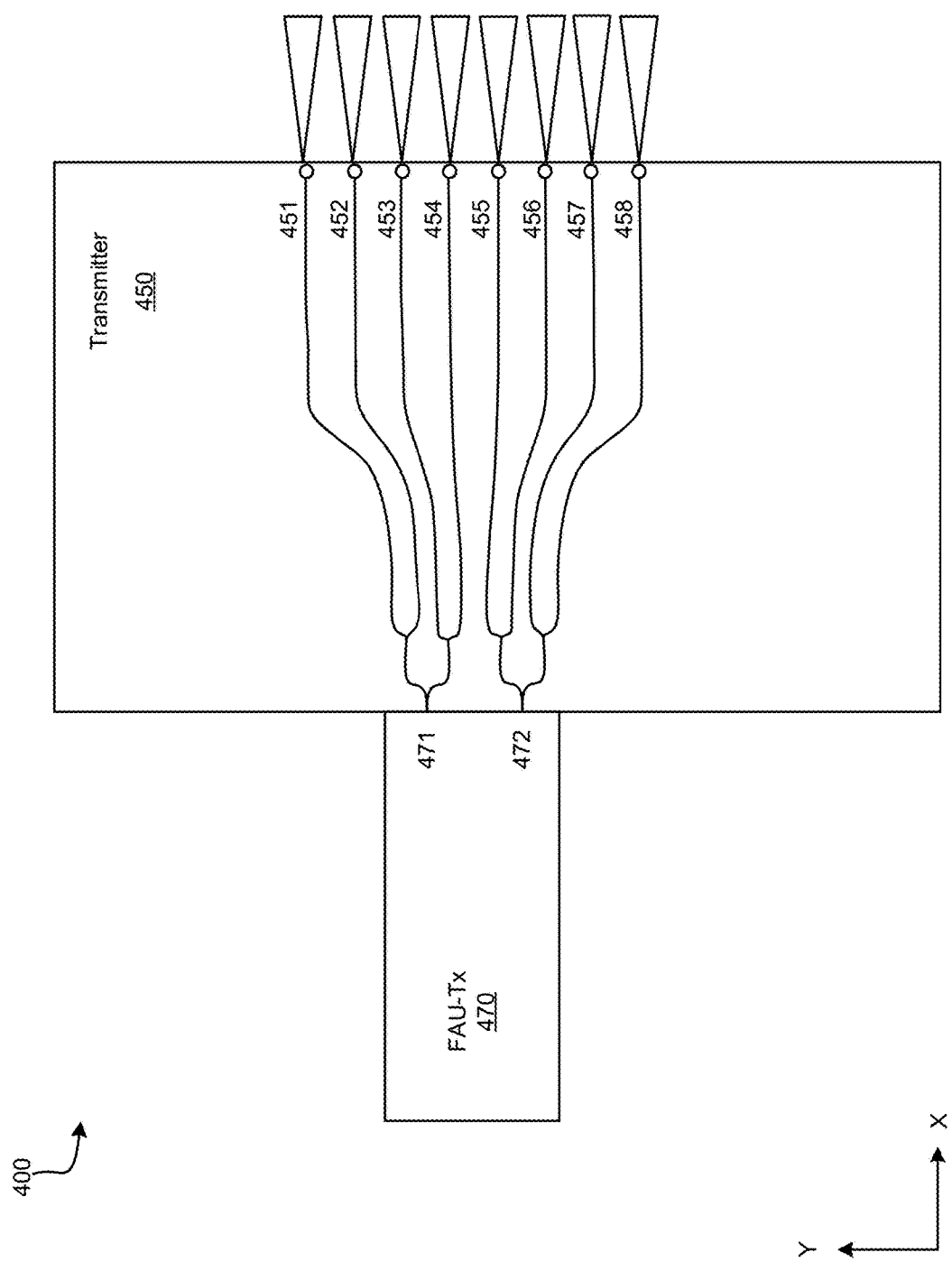

FIG. 4A and FIG. 4B are block diagrams illustrating an example configuration 400 of a bistatic transceiver (e.g., transmitter 450 and receiver 410 as separate layers) according to some implementations. The bistatic transceiver may be manufactured or configured to vertically decouple or functionally separate high power optical beams (e.g., Tx beams transmitted on the transmitter 450) from low power optical beams (e.g., Rx beams and/or LO signals on the receiver 410) to mitigate a risk of crosstalk of the high-power beams. The transmitter 410 and the receiver 450 as separate layers may be functionally separated out or vertically decoupled to mitigate the risk of interference and/or crosstalk. The transmitter 450 may include at least one of a Tx waveguide or a Tx grating coupler or any other optical transmitter. The receiver 410 may include at least one of a Rx waveguide or a Rx grating coupler or any other optical receiver.

Referring to FIG. 4A, the receiver layer 410 may receive 8 beams through 8 Rx inputs or channels 411, 412, 413, 414, 415, 416, 417, 418, and receive two LO signals from a fiber array (or FAU) 420 through two LO inputs 421, 424. The receiver layer may receive the same number of beams as the number of beams the transmitter may send (e.g., 8 beams in FIG. 4).

Referring to FIG. 4B, The transmitter layer 450 may include a 2×8 splitter, thereby (1) receiving 2 Tx beams from a fiber array (or FAU) 470 through Tx inputs 471, 472, and (2) transmitting multiple beams through multiple Tx channels or outputs 451, 452, 453, 454, 455, 456, 457, 458. The transceiver may transmit and/or receive linearly polarized beams.

The bistatic transceiver illustrated in FIG. 4A and FIG. 4B can operate in a manner similar to that of the transceiver 310 illustrated in FIG. 3A. A laser source (e.g., laser 202 in FIG. 2) generates an LO signal via a Tx path and provides the LO signal to the LO input 421. The laser source provides an LO signal to another LO input 424 in a similar manner. The receiver layer 410 may split the LO signal received at the LO input 421 into LO signals to be provided to detectors 431-434 (collectively "detector 430"). Similarly, the receiver layer 410 may split the LO signal received at the LO input 424 into LO signals to be provided to the detectors 441-444 (collectively "detector 440").

The laser source generates a light signal via a Tx path (e.g., the Tx path in FIG. 2) and provides the light signal to the Tx input 471. The laser source provides a light signal to a Tx input 472 in a similar manner. The transmitter layer 450 splits the light signal received at the Tx input 471 into light signals to be transmitted into free space (towards one or more objects) via Tx outputs 451, 452, 453, 454. Similarly, the transmitter layer 450 splits the light signal received at the Tx input 472 into light signals to be transmitted into free space (towards one or more objects) via Tx outputs 455, 456, 457, 458.

In response to transmitting the light signals transmitted into free space via the Tx outputs 451, 452, 453, 454, the receiver layer 410 may receive the returned lights reflected back from an object via Rx inputs 411, 412, 413, 414, and provides the returned lights and corresponding LO signals to the detector 431, 432, 433, 434, respectively. The detectors generate electrical signals based on the returned lights and/or the corresponding LO signals. Similarly, in response to transmitting the light signals transmitted into free space via the Tx outputs 455, 456, 457, 458, the receiver layer 410 may receive the returned lights reflected back from an object via Rx inputs 415, 416, 417, 418, and provides the returned lights and corresponding LO signals to the detector 441, 442, 443, 444, respectively.

Referring to FIG. 4A and FIG. 4B, although Rx optical paths and/or LO optical paths may cross (e.g., overlap, intersect, traverse) Tx optical paths at a crossing point, the vertical separation and/or decoupling of the transmitter layer 410 and the receiver layer 450 can mitigate the risk of the interference and/or crosstalk.

In some implementations, the transmitter layer 450 and the receiver 410 may be manufactured, packaged, or integrated in a chip or integrated circuit level. For example, the bistatic transceiver may be implemented in a single chip or integrated circuit. In some implementations, each of the transmitter layer 450 and the receiver layer 410 may be a layer of a single chip or integrated circuit. In some implementations, the transmitter layer 450 and the receiver layer 410 may be manufactured and/or packaged in a wafer level. In some implementations, each of the transmitter layer 450 and the receiver layer 410 may be a layer of a wafer-level packaging.

Figure 5A:
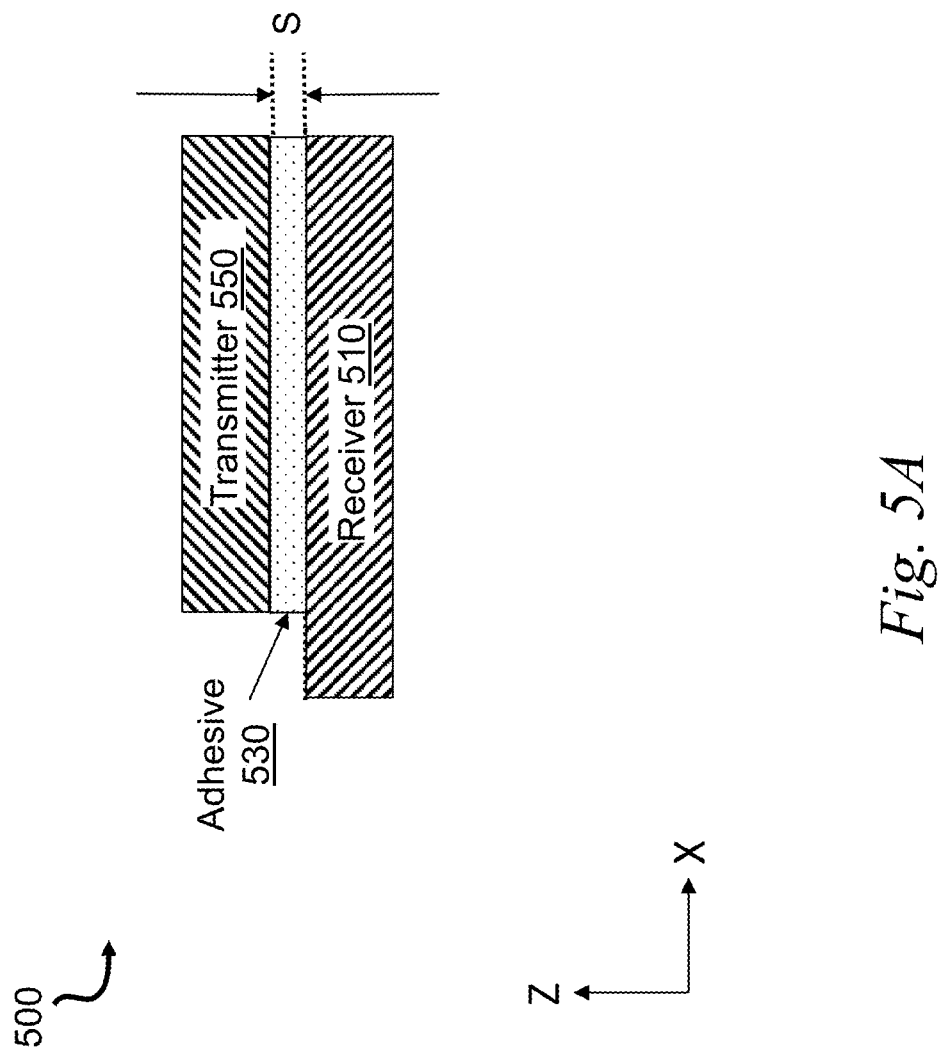
FIG. 5A, FIG. 5B and FIG. 5C are block diagrams illustrating an example configuration of a bistatic transceiver according to some implementations.
Figure 5B:
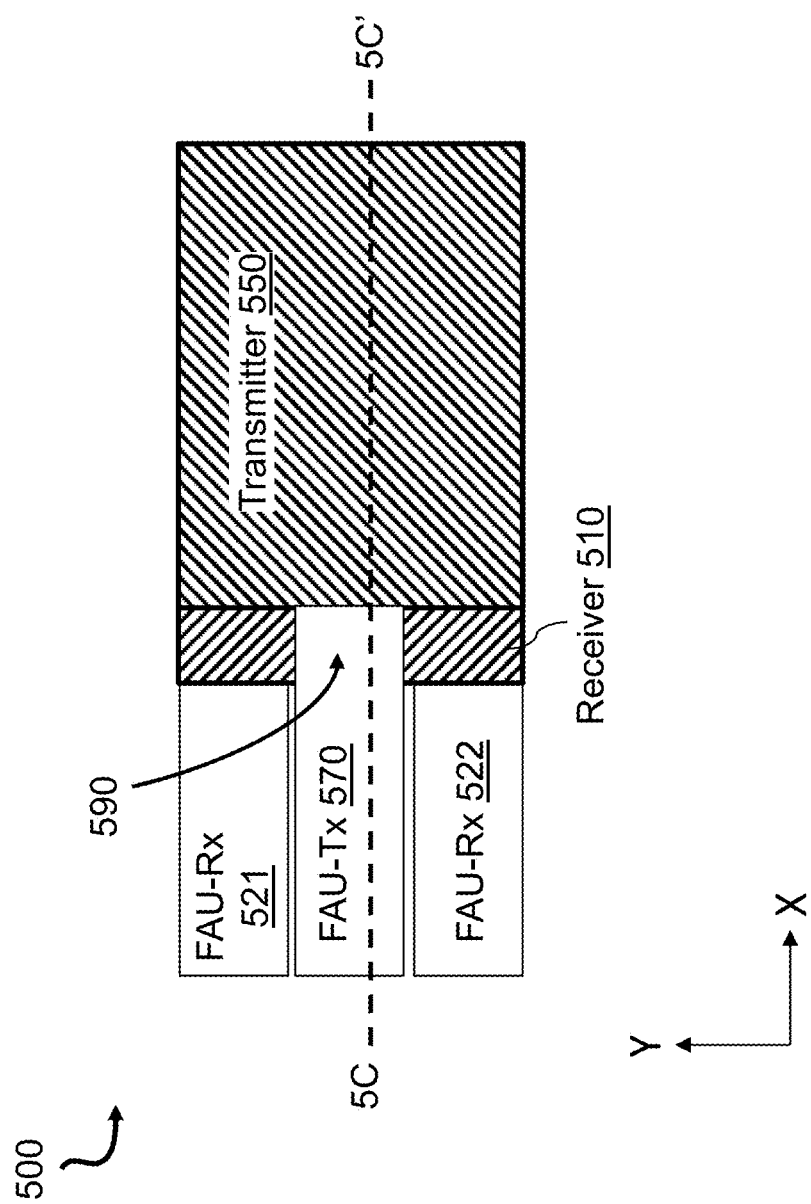
Figure 5C:
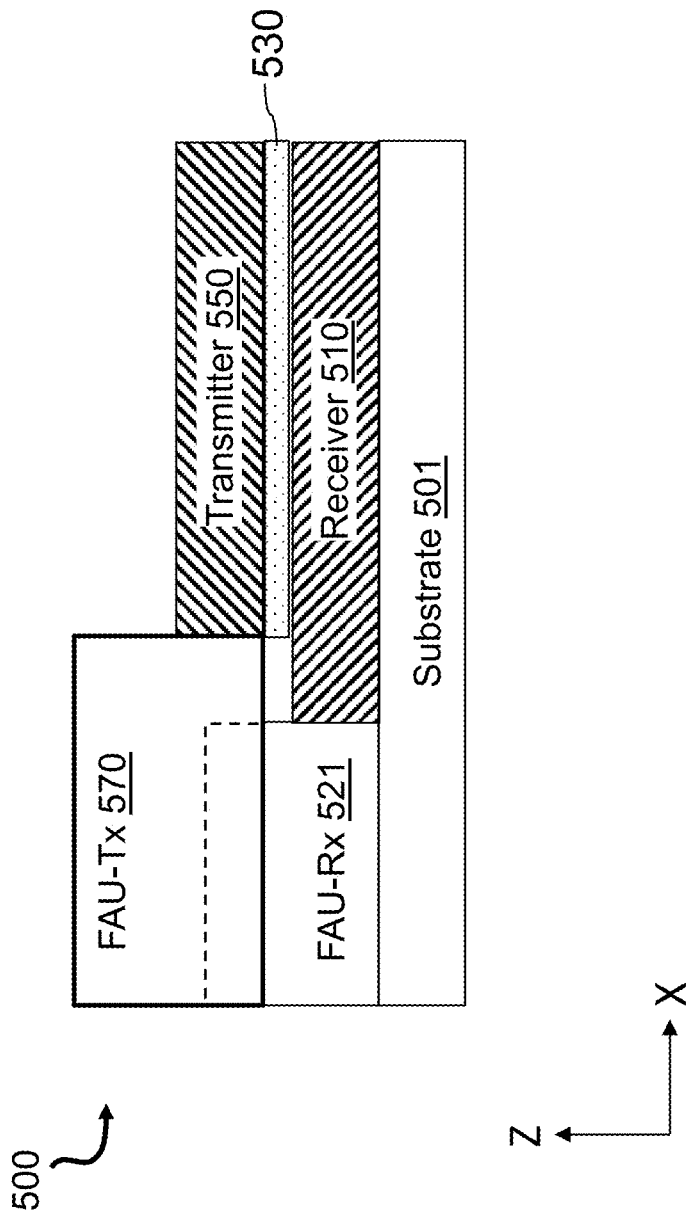

FIG. 5A, FIG. 5B and FIG. 5C are block diagrams illustrating an example configuration 500 of a bistatic transceiver including a receiver layer 510 and a transmitter layer 550, according to some implementations. The receiver layer 510 and the transmitter layer 550 may have configurations similar to those of the receiver layer 410 and the transmitter layer 450 (see FIG. 4A and FIG. 4B), respectively. The transmitter 550 may include at least one of a Tx waveguide or a Tx grating coupler or any other optical transmitter. The receiver 510 may include at least one of a Rx waveguide or a Rx grating coupler or any other optical receiver.

FIG. 5A is a cross-sectional view of the bistatic transceiver according to some implementations. In a bistatic transceiver, the transmitter layer 550 and the receiver layer 510 may be vertically split and vertically sandwich or interpose an adhesive 530 (e.g., adhesive layer) therebetween in Z direction. A material of the adhesive 530 may include at least one of SU-8, benzocyclobutene (BCB), polyimide, epoxy, acrylic or phenol butyral.

In some implementations, the bistatic transceiver may be manufactured by stacking one of the transmitter layer 550 or the receiver layer 510 on top of each other with a spacing S, resulting in a dual layer structure in the depth direction (e.g., Z direction). In some implementations, the spacing S may be in a range of 40 μm to 125 μm. In some implementations, the spacing S may be in a range of 40 μm to 100 μm. If the spacing S is too small, e.g., less than 40 μm, interference and/or crosstalk may be induced. If the spacing S is too large, e.g., greater than 125 μm, the bistatic transceiver may not meet a constraint and/or requirement of displacement between the transmitter and the receiver, configured by optical components, so that the transceiver may not be integrated with the optical components.

Referring to FIG. 5A, the length of the bistatic transceiver in the length direction (e.g., X direction) may be in a range of 15 mm to 20 mm. The height of the bistatic transceiver in a depth direction (e.g., Z direction) may be in a range of 6 mm to 8 mm (for example, 7 mm).

FIG. 5B is a plan view of the bistatic transceiver according to some implementations. On the X-Y plane, the transmitter layer 550 and the receiver layer 510 may be aligned such that an edge of the transmitter layer (e.g., left edge of the transmitter layer 550 extending in Y direction) and an edge of the receiver layer (e.g., left edge of the receiver layer 510 extending in Y direction) are parallel to each other in X direction. Referring to FIG. 5A and FIG. 5B, the length of the receiver layer 510 (e.g., length in X direction) may be longer than that of the transmitter layer 550.

Referring to FIG. 5B, a Tx fiber array 570 may be coupled to inputs of the transmitter layer 550 and a Rx fiber array 521, 522 may be coupled to inputs of the receiver layer 510. At least one of the Tx fiber array or the Rx fiber array may be a fiber array unit (FAU). The inputs of the transmitter layer 550 may be Tx inputs. The inputs of the receiver layer 510 may be LO inputs. In a plan view (e.g., on X-Y plane), the Tx fiber array 570 and the Rx fiber array 521, 522 may not vertically overlap each other. On the plan view, the Rx fiber array may include a first Rx fiber array 521 and a second Rx fiber array 522, both extending in the length direction (e.g., X direction) and spaced from each other in the width direction (e.g., Y direction). On the plan view, the Tx fiber array 570 may be sandwiched or interposed between the first Rx fiber array 521 and the second Rx fiber array 522 in the width direction (e.g., Y direction). In the plan view, the Tx fiber array 570 may vertically overlap the receiver layer 510 in a horizontal portion 590.

FIG. 5C shows a cross section of the plan view of FIG. 5B, cut along the line 5C-5C'. Referring to FIG. 5C, the receiver layer 510, the first Rx fiber array 521, and the second Rx fiber array (not shown) may be stacked on a top surface of a substrate 501. A bottom surface of the Tx fiber array 570 may be located at the same level or above a top surface of the receiver layer 510 in the depth direction (e.g., Z direction). The Tx fiber array 570 and the Rx fiber array (e.g., first fiber array 521) may at least partially overlap each other in the width direction (e.g., in the Y direction). The height (or depth) of the Tx fiber array 570 may be greater than or equal to the transmitter layer 550. The height (or depth) of the Rx fiber array 521, 522 may be greater than or equal to the receiver layer 510.

In some implementations, the transmitter layer 550 and the receiver layer 510 may be actively aligned. For example, the transceiver is powered to find an alignment between a PLC transmitter layer and a PLC receiver layer on a plan view (X-Y plane). In some implementations, each of the transmitter layer 550 and the receiver layer 510 may be a chip or an integrated circuit (e.g., PLC chip), and the transmitter chip 550 and the receiver chip 510 may be actively aligned.

Referring to FIG. 5A to FIG. 5C, a horizontal arrangement of the Tx fiber array 570 and the Rx fiber array 521, 522 may be performed by horizontally separating the Tx fiber array and the Rx fiber array on X-Y plane. In some implementations, the Tx fiber array 570 and the Rx fiber array 521, 522 may be horizontally separated by horizontally separating Tx paths (on the transmitter layer 550) and Rx paths (on the receiver layer 510). For example, as shown in FIG. 4A and FIG. 4B, Tx paths on the transmitter layer 450 and Rx paths on the receiver layer 410 may be separated (at least on the left side of the bistatic transceiver). Referring to FIG. 5B and FIG. 5C, the Tx fiber array 570 may be only connected to the transmitter layer 550 (e.g., upper layer) in a first horizontal portion where Tx optical paths are disposed (e.g., in the middle portion of the transmitter layer 550 as shown in FIG. 5B), while the Rx fiber array 521, 522 may be connected to the receiver layer 510 (e.g., lower layer) in a second horizontal portion (e.g., in the upper and lower portions of the receiver layer 510 as shown in FIG. 5B) that does not vertically overlap the first horizontal portion.

In some implementations, one FAU (not shown) may include a plurality of fiber arrays with different depths or heights. For example, a first fiber array of an FAU (not shown) with a first depth may be connected to an upper layer (e.g., transmitter layer) while a second fiber array of the same FAU with a second depth smaller than the first depth may be connected to a lower layer (e.g., receiver layer).

In some implementations, a lidar system (e.g., lidar system 201) for a vehicle may include a receiver layer (e.g., receiver layer 410, 510), a transmitter layer (e.g., transmitter layer 450, 550) stacked on or coupled to the receiver layer through an adhesive layer (e.g., adhesive 530) in a first direction (e.g., Z direction), the adhesive layer being interposed between the transmitter layer (e.g., transmitter layer 550) and the receiver layer (e.g., receiver layer 510), and one or more optics. The transmitter layer may receive, at a first side of the transmitter layer (e.g., left edge of transmitter 450, 550 in FIG. 4B, FIG. 5B), a transmit signal from a laser source (e.g., laser 202), and transmit the transmit signal through the one or more optics. The receiver layer may receive, through the one or more optics, a return signal reflected by an object in an environment of the vehicle, and output the return signal at a first side of the receiver layer. The first side of the transmitter layer (e.g., left edge of transmitter layer in a plan view) and the first side of the receiver layer (e.g., left edge of receive layer in a plan view) may be spaced apart from each other and/or parallel to each other in a second direction (e.g., X direction) crossing the first direction (e.g., Z direction). With this parallel arrangement in the second direction (e.g., X direction), FAUs or fiber cables coupled to the transmitter layer and the receiver layer (e.g., FAUs 521, 522, 570 in FIG. 5B) can be arranged in parallel in a third direction (e.g., Y direction) crossing the first direction (e.g., Z direction) such that the FAUs or fiber cables do not overlap each other in the first direction (e.g., Z direction) to reduce interference or crosstalk between beams transmitted to the transceiver layer and beams and/or signals provided to or received from the receiver layer.

In some implementations, the receiver layer has a dimension (e.g., length) greater than that of the transmitter layer in the second direction (e.g., X direction). With this configuration, a portion of FAUs or fiber cables coupled to the transmitter layer (e.g., portion 590 of FAU-Tx 570 in FIG. 5B) can overlap (or be disposed on top of) the receiver layer so that that portion of FAUs or fiber cables does not overlap with FAUs or fiber cables coupled to the receiver layer (e.g., FAU-Rx 521, 522 in FIG. 5B) in the first, second, third directions (e.g., X, Y, Z directions), thereby reducing interference or crosstalk between beams transmitted to the transceiver layer and beams and/or signals received from the receiver layer.

In some implementations, each of the receiver layer and the transmitter layer includes at least one of silicon photonics circuitry, photonic lightwave circuit (PLC), or III-V semiconductor circuitry. The receiver layer, the adhesive layer, and the transmitter layer may be manufactured, packaged, or integrated in an integrated circuit (IC), providing a transceiver with reliability, low power consumption, ability to operate at extreme temperatures, light weight, and/or suitability for bulk production, compared to a transceiver with non-integrated electronic circuits.

In some implementations, the transmitter layer (e.g., transmitter layer 450) may include one or more splitters (e.g., 2×8 splitter) and a plurality of transmit (Tx) channels at a second side of the transmitter layer (e.g., right edge in FIG. 4B), the second side facing the one or more optics. With the one or more splitters, multiple beams can be transmitted through multiple Tx channels. The transmitter layer may be configured to split the transmit signal into a plurality of transmit signals using the one or more splitters, and transmit the plurality of transmit signals through the plurality of Tx channels, respectively.

In some implementations, the receiver layer (e.g., receiver layer 410) may include a plurality of receive (Rx) channels at a second side of the receiver layer (e.g., right edge in FIG. 4A), the second side facing the one or more optics. The return signal may include a plurality of return signals. The receiver layer may be configured to receive the plurality of return signals through the plurality of Rx channels, respectively.

In some implementations, the lidar system may further include one or more fiber arrays including one or more transmit (Tx) fiber cables (e.g., 471, 472 in FIG. 4B; FAU 570 in FIG. 5B) and one or more receive (Rx) fiber cables (e.g. 421, 424 in FIG. 4A1 FAU 521, 522 in FIG. 5B). The one or more Tx fiber cables may be coupled to the first side of the transmitter layer and configured to provide the transmit signal to the transmitter layer. The one or more Rx fiber cables may be coupled to the first side of the receiver layer and configured to provide an LO signal to the receiver layer. The one or more Tx fiber cables (e.g., FAU 570) and the one or more Rx fiber cables (e.g., FAU 521, 522) do not overlap in the first direction (e.g., Z direction; see FIG. 5B), thereby reducing interference or crosstalk between beams transmitted to the transceiver layer and beams and/or signals provided to or received from the receiver layer.

In some implementations, the one or more Rx fiber cables may include a first set of Rx fiber cables (e.g., FAU 521) and a second set of Rx fiber cables (e.g., FAU 522). The one or more Tx fiber cables (e.g., FAU 570) may be interposed between the first set of Rx fiber cables (e.g., FAU 521) and the second set of Rx fiber cables (e.g., FAU 522) in a third direction (e.g., Y direction) crossing the first direction (e.g., Z direction) and the second direction (e.g., X direction). With this configuration, the one or more Tx fiber cables may not overlap the first and second sets of Rx fiber cables in the first direction and the second direction, thereby reducing interference or crosstalk between beams transmitted to the transceiver layer and beams and/or signals provided to or received from the receiver layer.

In some implementations, the one or more Tx fiber cables (e.g., FAU 570) may overlap at least a portion of the receiver layer (e.g., 510) in the first direction (e.g. Z direction). The one or more Rx fiber cables (e.g., FAU 521, 522) do not overlap the transmitter layer (e.g., FAU 570) in the first direction (e.g., Z direction). With this configuration, interference or crosstalk can be reduced between beams transmitted to the transceiver layer and beams and/or signals provided to or received from the receiver layer.

In some implementations, the lidar system (e.g., lidar system 201) may further include the one or more Tx fiber arrays (e.g., FAU 570) coupled to the first side of the transmitter layer (e.g., left edge of transmitter layer 550 in FIG. 5B) and configured to provide the transmit signal to the transmitter layer, and one or more Rx fiber arrays (e.g., FAU 521, 522) coupled to the first side of the receiver layer (e.g., left edge of receiver layer 510 in FIG. 5B) and configured to provide an LO signal to the receiver layer. The one or more Tx fiber arrays (e.g., FAU 570) and the one or more Rx fiber arrays (e.g., FAU 521 522) do not overlap in the first direction (e.g., Z direction), thereby reducing interference or crosstalk between beams transmitted to the transceiver layer and beams and/or signals provided to or received from the receiver layer.

In some implementations, the one or more Rx fiber arrays may include a first Rx fiber array (e.g., FAU 521) and a second Rx fiber array (e.g., FAU 522). The one or more Tx fiber arrays (e.g., FAU 570) may be interposed between the first Rx fiber array (e.g., FAU 521) and the second Rx fiber array (e.g., FAU 522) in a third direction (e.g., Y direction) crossing the first direction (e.g., Z direction) and the second direction (e.g., X direction).

In some implementations, the one or more Tx fiber arrays (e.g., FAU 570) may have one or more fiber cables overlapping at least a portion of the receiver layer (e.g., receiver layer 510) in the first direction (e.g., Z direction). The one or more Rx fiber arrays (e.g., FAU 521, 522) do not have a fiber cable overlapping the transmitter layer (e.g., transmitter layer 550) in the first direction (e.g., Z direction).

In some implementations, a spacing (e.g., spacing S in FIG. 5A) between the transmitter layer and the receiver layer in the first direction may be greater than or equal to 40 micrometers and smaller than 125 micrometers. In some implementations, the one or more optics may include an optical displacer (e.g., birefringent displacer 660) configured to spatially separate the transmit signal and the return signal by a distance (e.g., distance 664). A spacing (e.g., S6 in FIG. 6) between the transmitter layer and the receiver layer in the first direction is smaller than the distance (e.g., distance 664). In some implementations, the distance may be greater than or equal to 100 micrometers and smaller than 150 micrometers.

FIG. 6 is a block diagram illustrating an example of a lidar system 600 including a bistatic transceiver 620, according to some implementations. In some implementations, the bistatic transceiver 620 may include a pair of waveguides including a transmission waveguide 623 (as transmitter layer) and a receiving waveguide 625 (as receiver layer), separated by a separation 621.

In some implementations, the bistatic transceiver 620 are standard telecom components which have sub-micron alignment tolerances between parallel optical fibers defined through photolithographic techniques. The transmission waveguide layer 623 and/or the receiving waveguide layer 625 are polarization maintaining (PM) waveguides or fibers. The bistatic transceiver 620 may have configuration similar to that shown in FIG. 5A to FIG. 5C. One of the transmission waveguide layer 623 or the receiving waveguide layer 625 may be stacked on top of each other with a spacing S6. An adhesive layer (e.g., adhesive 530) interposed between the transmission waveguide layer 623 and the receiver layer (e.g., receiver layer 510). A Tx fiber array 622 may be coupled to inputs of the transmission waveguide layer 623 and a Rx fiber array 624 may be coupled to inputs of the receiving waveguide layer 625.

In some implementations, the lidar system 600 includes a free space optic 660 (e.g., a birefringent displacer) that does not displace beams with a first linear polarization (e.g., vertical linear polarization) and does displace beams with a second linear polarization (e.g., horizontal linear polarization) orthogonal to the first linear polarization by a distance 664 orthogonal to a direction of the beams. In some implementations, the distance 664 is based on a length 662 of the free space optic 660 that the beam traverses and/or the material of the free space optic 660.

As depicted in FIG. 6, the free space optic 660 (e.g., birefringent displacer) and polarization transforming optic (e.g., quarter wave plate 611) are positioned between the bistatic transceiver 620 and the collimating optics 629. In some implementations, the collimating optics and/or scanning optics 629 direct the transmitted beam 605 at the target 692. Here, reflection of the return beam 691 from the target 692 causes a phase change from the first circular polarization to a second circular polarization. The collimating optics and/or scanning optics 629 direct the return beam 691 with the second circular polarization at the quarter wave plate 611 which adjusts the second circular polarization into the second linear polarization that is orthogonal to the first linear polarization of the transmitted beam 605.

In some implementations, the return beam 291 with the second linear polarization is incident on the free space optic 660 (e.g., a birefringent displacer). Since the free space optic 660 displaces incident beams with the second linear polarization, the return beam 691 is displaced by the distance 664 in a direction orthogonal to a direction of travel of the return beam 691 as the return beam 691 passes through the free space optic 660.

In some implementations, a value of the separation 621 can be selected based on (1) a scan speed of a polygon scanner, (2) a target design range over the range of scanning angles, and (3) a diameter of a transmission waveguide, to optimize the SNR. The length 662 of the free space optic 660 and/or the material of the free space optic 660 is selected so that the distance 664 is adjusted based on the separation 621 of the transmission waveguide layer 623 and receiving waveguide layer 625. In an example implementation, the length 662 and/or material of the free space optic 660 is selected so that the distance 664 is about equal to (e.g., within +2% or +5%) the separation 621.

In an example implementation, the separation 621 is about 127 μm or in a range from about 100 μm to about 150 μm and/or in a range from about 50 μm to about 300 μm. The spacing S5 is smaller than the separation 621 and may be in a range from about 40 μm to about 100 μm and/or in a range from about 40 μm to about 125 μm.

Figure 7:
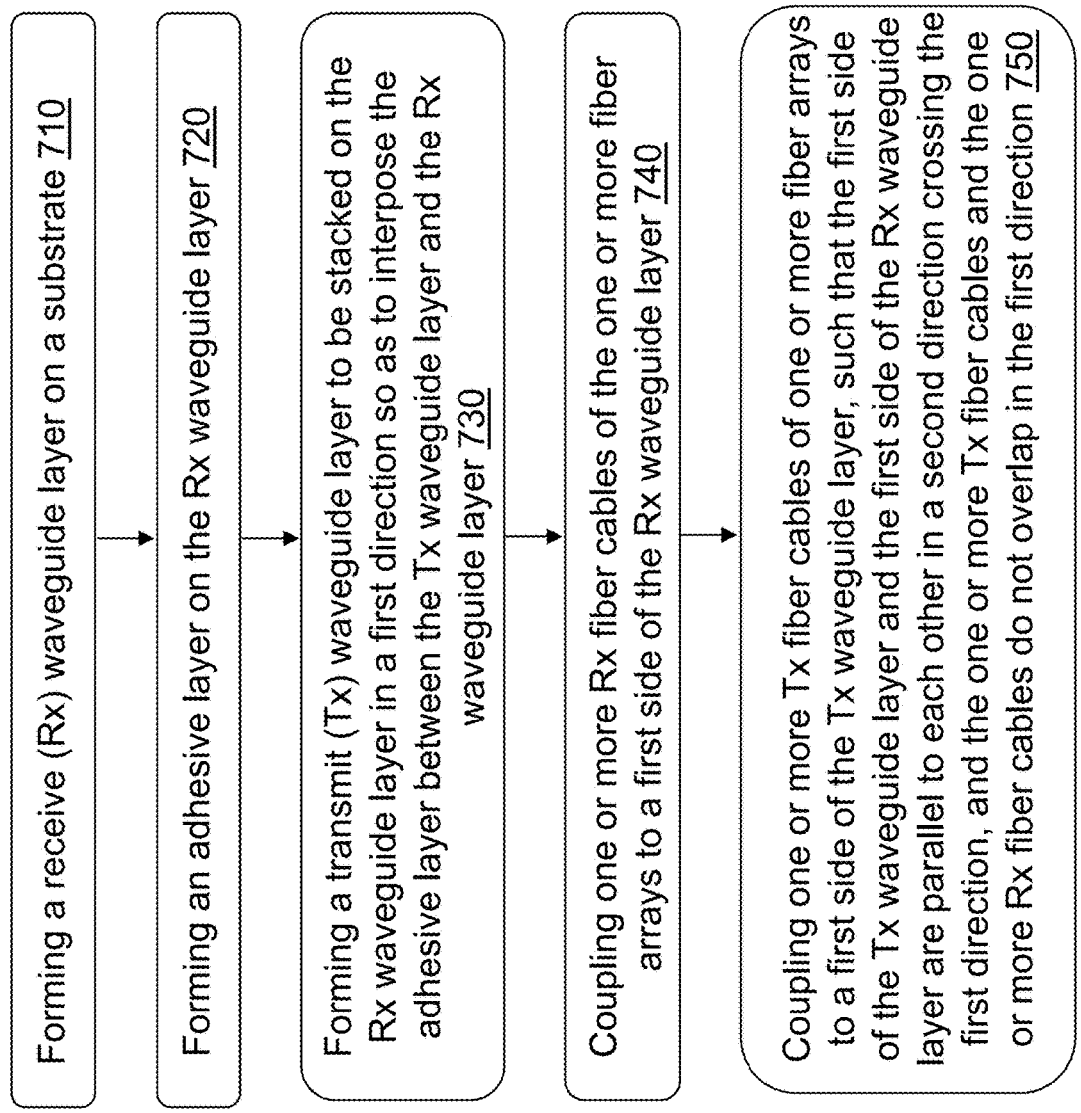
FIG. 7 is a flowchart illustrating an example methodology for manufacturing a lidar system including a bistatic transceiver, according to some implementations.

FIG. 7 is a flowchart illustrating an example methodology for manufacturing a lidar system (e.g., lidar system 201) including a bistatic transceiver (see FIG. 4A and FIG. 4B; FIG. 5A to FIG. 5C), according to some implementations.

Referring back to FIG. 7, in this example methodology, a process 700 begins at step 710 by forming or disposing a receive (Rx) waveguide layer (e.g., receiver layer 410, 510) on a substrate (e.g., substrate 501). In some implementations, the Rx waveguide layer and a Tx waveguide layer may be actively aligned before disposing the Rx waveguide layer on the substrate. For example, the transceiver is powered to find an alignment between the Rx waveguide layer and the Tx waveguide layer on a plan view (X-Y plane).

At step 720, in some implementations, an adhesive layer (e.g., adhesive 530) may be formed on the Rx waveguide layer (e.g., receiver layer 510).

At step 730, in some implementations, the transmit (Tx) waveguide layer (e.g., transmitter layer 450, 550) may be disposed or formed or stacked on the Rx waveguide layer (e.g., receiver layer 410, 510) in a first direction (e.g., Z direction) so as to interpose the adhesive layer between the Tx waveguide layer and the Rx waveguide layer.

At step 740, in some implementations, one or more receive (Rx) fiber cables of the one or more fiber arrays (e.g., FAU 521, 522) may be coupled to a first side of the Rx waveguide layer (e.g., left edge of receive layer 510 in FIG. 5B). In some implementations, the one or more Rx fiber cables may be formed on the substrate 501.

At step 750, in some implementations, one or more transmit (Tx) fiber cables (e.g., FAU 570) of one or more fiber arrays may be coupled to a first side of the Tx waveguide layer (e.g., left edge of transmitter layer 550 in FIG. 5B). The first side of the Tx waveguide layer and the first side of the Rx waveguide layer may be parallel to each other in a second direction (e.g., X direction) crossing the first direction (e.g., Z direction). In some implementations, the one or more Tx fiber cables may be formed on the Rx waveguide layer. The one or more Tx fiber cables (e.g., FAU 570) and the one or more Rx fiber cables (e.g., FAU 521, 522) do not overlap in the first direction (e.g., Z direction).

In some implementations, each of the Rx waveguide layer and the Tx waveguide layer may include at least one of silicon photonics circuitry, photonic lightwave circuit (PLC), or III-V semiconductor circuitry. In some implementations, the Rx waveguide layer, the adhesive layer, and the Tx waveguide layer may be manufactured, packaged, or integrated in an integrated circuit (IC) using wafer-level packaging. The IC may include at least one of silicon photonics circuitry, photonic lightwave circuit (PLC), or III-V semiconductor circuitry.

FIG. 8 is a block diagram illustrating an example of a computing system according to some implementations.

Referring to FIG. 8, the illustrated example computing system 800 includes one or more processors 810 in communication, via a communication system 840 (e.g., bus), with memory 860, at least one network interface controller 830 with network interface port for connection to a network (not shown), and other components, e.g., an input/output ("I/O") components interface 850 connecting to a display (not illustrated) and an input device (not illustrated). Generally, the processor(s) 810 will execute instructions (or computer programs) received from memory. The processor(s) 810 illustrated incorporate, or are directly connected to, cache memory 820. In some instances, instructions are read from memory 860 into the cache memory 820 and executed by the processor(s) 810 from the cache memory 820.

In more detail, the processor(s) 810 may be any logic circuitry that processes instructions, e.g., instructions fetched from the memory 860 or cache 820. In some implementations, the processor(s) 810 are microprocessor units or special purpose processors. The computing device 800 may be based on any processor, or set of processors, capable of operating as described herein. The processor(s) 810 may be single core or multi-core processor(s). The processor(s) 810 may be multiple distinct processors.

The memory 860 may be any device suitable for storing computer readable data. The memory 860 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, or Blu-Ray® discs). A computing system 800 may have any number of memory devices as the memory 860.

The cache memory 820 is generally a form of computer memory placed in close proximity to the processor(s) 810 for fast read times. In some implementations, the cache memory 820 is part of, or on the same chip as, the processor(s) 810. In some implementations, there are multiple levels of cache 820, e.g., L2 and L3 cache layers.

The network interface controller 830 manages data exchanges via the network interface (sometimes referred to as network interface ports). The network interface controller 830 handles the physical and data link layers of the OSI model for network communication. In some implementations, some of the network interface controller's tasks are handled by one or more of the processor(s) 810. In some implementations, the network interface controller 830 is part of a processor 810. In some implementations, a computing system 800 has multiple network interfaces controlled by a single controller 830. In some implementations, a computing system 800 has multiple network interface controllers 830. In some implementations, each network interface is a connection point for a physical network link (e.g., a cat-5 Ethernet link). In some implementations, the network interface controller 830 supports wireless network connections and an interface port is a wireless (e.g., radio) receiver and/or transmitter (e.g., for any of the IEEE 802.11 protocols, near field communication "NFC", Bluetooth, ANT, or any other wireless protocol). In some implementations, the network interface controller 830 implements one or more network protocols such as Ethernet. Generally, a computing device 800 exchanges data with other computing devices via physical or wireless links through a network interface. The network interface may link directly to another device or to another device via an intermediary device, e.g., a network device such as a hub, a bridge, a switch, or a router, connecting the computing device 800 to a data network such as the Internet.

The computing system 800 may include, or provide interfaces for, one or more input or output ("I/O") devices. Input devices include, without limitation, keyboards, microphones, touch screens, foot pedals, sensors, MIDI devices, and pointing devices such as a mouse or trackball. Output devices include, without limitation, video displays, speakers, refreshable Braille terminal, lights, MIDI devices, and 2-D or 3-D printers.

Other components may include an I/O interface, external serial device ports, and any additional co-processors. For example, a computing system 800 may include an interface (e.g., a universal serial bus (USB) interface) for connecting input devices, output devices, or additional memory devices (e.g., portable flash drive or external media drive). In some implementations, a computing device 800 includes an additional device such as a co-processor, e.g., a math co-processor can assist the processor 810 with high precision or complex calculations.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of blocks in the processes disclosed is an example of illustrative approaches. Based upon design preferences, it is understood that the specific order or hierarchy of blocks in the processes may be rearranged while remaining within the scope of the previous description. The accompanying method claims present elements of the various blocks in a sample order, and are not meant to be limited to the specific order or hierarchy presented.

The previous description of the disclosed implementations is provided to enable any person skilled in the art to make or use the disclosed subject matter. Various modifications to these implementations will be readily apparent to those skilled in the art, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the blocks of various examples must be performed in the order presented. As will be appreciated by one of skill in the art the order of blocks in the foregoing examples may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the examples disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In some exemplary examples, the functions described may be implemented in hardware, software, firmware, or any combination thereof. If implemented in software, the functions may be stored as one or more instructions or code on a non-transitory computer-readable storage medium or non-transitory processor-readable storage medium. The blocks of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable any person skilled in the art to make or use the present disclosure. Various modifications to these examples will be readily apparent to those skilled in the art, and the generic principles defined herein may be applied to some examples without departing from the spirit or scope of the disclosure. Thus, the present disclosure is not intended to be limited to the examples shown herein but is to be accorded the widest scope consistent with the following claims and the principles and novel features disclosed herein.

What is claimed is:

1. A light detection and ranging (lidar) system for a vehicle, the lidar system comprising:
   a receiver layer;
   a transmitter layer coupled to on the receiver layer through an adhesive layer in a first direction; and
   one or more optics, wherein
   the transmitter layer is configured to receive, at a first side surface of the transmitter layer, a transmit signal from a laser source, and transmit the transmit signal through the one or more optics,
   the receiver layer is configured to receive, through the one or more optics, a return signal reflected by an object in an environment of the vehicle, and output the return signal at a first side surface of the receiver layer, and
   the first side surface of the transmitter layer and the first side surface of the receiver layer are apart from each other in a second direction crossing the first direction, and each of the first side surface of the transmitter layer and the first side surface of the receiver layer extends in a third direction crossing the first direction and the second direction.

2. The lidar system as recited in claim 1, wherein the receiver layer has a dimension greater than that of the transmitter layer in the second direction.

3. The lidar system as recited in claim 1, wherein each of the receiver layer and the transmitter layer includes at least one of silicon photonics circuitry, photonic lightwave circuit (PLC), or III-V semiconductor circuitry.

4. The lidar system as recited in claim 3, wherein the receiver layer, the adhesive layer, and the transmitter layer are packaged in an integrated circuit (IC).

5. The lidar system as recited in claim 1, wherein the transmitter layer comprises one or more splitters and a plurality of transmit (Tx) channels at a second side of the transmitter layer, the second side facing the one or more optics,
   the transmitter layer is configured to
   split the transmit signal into a plurality of transmit signals using the one or more splitters, and
   transmit the plurality of transmit signals through the plurality of Tx channels, respectively.

6. The lidar system as recited in claim 1, wherein
   the receiver layer comprises a plurality of receive (Rx) channels at a second side of the receiver layer, the second side facing the one or more optics,
   the return signal comprises a plurality of return signals, and
   the receiver layer is configured to receive the plurality of return signals through the plurality of Rx channels, respectively.

7. The lidar system as recited in claim 1, further comprising:
   one or more fiber arrays including (1) one or more transmit (Tx) fiber cables coupled to the first side surface of the transmitter layer and (2) one or more receive (Rx) fiber cables coupled to the first side surface of the receiver layer,
   wherein the one or more Tx fiber cables and the one or more Rx fiber cables do not overlap in the first direction.

8. The lidar system as recited in claim 1, further comprising:
   one or more fiber arrays including one or more transmit (Tx) fiber cables and one or more receive (Rx) fiber cables, wherein
   the one or more Tx fiber cables are coupled to the first side surface of the transmitter layer and configured to provide the transmit signal to the transmitter layer, and
   the one or more Rx fiber cables are coupled to the first side surface of the receiver layer and configured to provide a local oscillator (LO) signal to the receiver layer.

9. The lidar system as recited in claim 8, wherein the one or more Tx fiber cables and the one or more Rx fiber cables do not overlap in the first direction.

10. The lidar system as recited in claim 8, wherein
    the one or more Rx fiber cables comprise a first set of Rx fiber cables and a second set of Rx fiber cables, and
    the one or more Tx fiber cables are interposed between the first set of Rx fiber cables and the second set of Rx fiber cables in the third direction crossing the first direction and the second direction.

11. The lidar system as recited in claim 8, wherein
    the one or more Tx fiber cables overlap at least a portion of the receiver layer in the first direction, and
    the one or more Rx fiber cables do not overlap the transmitter layer in the first direction.

12. The lidar system as recited in claim 1, further comprising:
    one or more Tx fiber arrays coupled to the first side surface of the transmitter layer and configured to provide the transmit signal to the transmitter layer, and
    one or more Rx fiber arrays coupled to the first side surface of the receiver layer and configured to provide an LO signal to the receiver layer.

13. The lidar system as recited in claim 12, wherein the one or more Tx fiber arrays and the one or more Rx fiber arrays do not overlap in the first direction.

14. The lidar system as recited in claim 12, wherein
    the one or more Rx fiber arrays comprise a first Rx fiber array and a second Rx fiber array, and
    the one or more Tx fiber arrays are interposed between the first Rx fiber array and the second Rx fiber array in the third direction crossing the first direction and the second direction.

15. The lidar system as recited in claim 12, wherein
the one or more Tx fiber arrays have one or more fiber cables overlapping at least a portion of the receiver layer in the first direction, and
the one or more Rx fiber arrays do not have a fiber cable overlapping the transmitter layer in the first direction.

16. The lidar system as recited in claim 1, wherein a spacing between the transmitter layer and the receiver layer in the first direction is greater than or equal to 40 micrometers and smaller than 125 micrometers.

17. The lidar system as recited in claim 1, wherein
the one or more optics comprise an optical displacer configured to spatially separate the transmit signal and the return signal by a distance, and
a spacing between the transmitter layer and the receiver layer in the first direction is smaller than the distance.

18. The lidar system as recited in claim 17, wherein the distance is greater than or equal to 100 micrometers and smaller than 150 micrometers.

19. An autonomous vehicle control system comprising one or more processors, wherein the one or more processors are configured to:
cause a transmitter layer to receive, at a first side surface of the transmitter layer, a transmit signal from a laser source, and transmit the transmit signal through one or more optics, wherein the transmitter layer is coupled to on a receiver layer through an adhesive layer in a first direction; and
cause the receiver layer to receive, through the one or more optics, a return signal reflected by an object in an environment of the vehicle, and output the return signal at a first side surface of the receiver layer,
wherein the first side surface of the transmitter layer and the first side surface of the receiver layer are apart from each other in a second direction crossing the first direction, and each of the first side surface of the transmitter layer and the first side surface of the receiver layer extends in a third direction crossing the first direction and the second direction.

20. An autonomous vehicle comprising a light detection and ranging (lidar) system, wherein
the lidar system comprises:
a receiver layer;
a transmitter layer coupled to the receiver layer in a first direction through an adhesive layer in a first direction; and
one or more optics,
the transmitter layer is configured to receive, at a first side surface of the transmitter layer, a transmit signal from a laser source, and transmit the transmit signal through the one or more optics,
the receiver layer is configured to receive, through the one or more optics, a return signal reflected by an object in an environment of the vehicle, and output the return signal at a first side surface of the receiver layer, and
the first side surface of the transmitter layer and the first side surface of the receiver layer are apart from and parallel to each other in a second direction crossing the first direction, and each of the first side surface of the transmitter layer and the first side surface of the receiver layer extends in a third direction crossing the first direction and the second direction.

* * * * *